US006990160B1

(12) United States Patent
Abe et al.

(10) Patent No.: US 6,990,160 B1
(45) Date of Patent: Jan. 24, 2006

(54) RECEPTION APPARATUS AND METHOD

(75) Inventors: Katsuaki Abe, Kawasaki (JP); Masayuki Orihashi, Ichikawa (JP); Job Cleopa Msuya, Kawasaki (JP); Morikazu Sagawa, Inagi (JP); Masayoshi Yoneyama, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 863 days.

(21) Appl. No.: 09/661,306

(22) Filed: Sep. 13, 2000

(30) Foreign Application Priority Data

Sep. 17, 1999 (JP) ............................... 11-262967

(51) Int. Cl.
*H04L 7/00* (2006.01)

(52) U.S. Cl. .................................................... 375/355
(58) Field of Classification Search ................ 375/355, 375/354, 362, 371, 357, 316, 324, 326, 328
See application file for complete search history.

(56) References Cited

U.S. PATENT DOCUMENTS

| 4,730,343 | A | * | 3/1988 | Kanemasa et al. .......... 375/233 |
| 5,369,668 | A | * | 11/1994 | Yamamoto ................... 375/233 |
| 5,453,834 | A | * | 9/1995 | Evenstad ..................... 356/450 |
| 5,563,596 | A | * | 10/1996 | Snyder et al. ............... 341/131 |
| 5,602,879 | A | * | 2/1997 | Wada ........................... 375/355 |
| 5,715,240 | A |   | 2/1998 | Borras et al. |
| 5,796,787 | A | * | 8/1998 | Chen et al. .................. 375/362 |
| 5,867,542 | A |   | 2/1999 | Iwamatsu et al. |
| 5,886,844 | A | * | 3/1999 | Shimizu ....................... 360/65 |
| 5,920,220 | A |   | 7/1999 | Takao et al. |
| 6,037,986 | A | * | 3/2000 | Zhang et al. ........... 375/240.12 |
| 6,130,577 | A |   | 10/2000 | Tamba et al. |
| 6,130,920 | A | * | 10/2000 | Powell et al. ............... 375/343 |
| 6,366,629 | B1 | * | 4/2002 | Chen et al. .................. 375/355 |
| 6,501,811 | B1 | * | 12/2002 | Yamada ....................... 375/355 |

FOREIGN PATENT DOCUMENTS

| EP | 0821503 | 1/1998 |
| JP | 55-79541 | 6/1980 |
| JP | 6-232933 | 8/1994 |
| JP | 11004273 A | * | 1/1999 |
| WO | 97/01908 | 1/1997 |

OTHER PUBLICATIONS

English Language abstract of JP-6-232933.
English Language abstract of JP-55-79541.

* cited by examiner

*Primary Examiner*—Kevin Burd
(74) *Attorney, Agent, or Firm*—Greenblum & Bernstein, P.L.C.

(57) ABSTRACT

A phase of a sampling clock provided from clock generating circuit 107 is switched periodically and alternately with a phase difference of 180 degrees, and during a period of each phase, timing estimating circuit 105 estimates a symbol timing. High-accuracy timing estimating circuit 109 selects an estimated result with higher reliability among symbol timing estimated results obtained in respective periods, thereby enabling estimation of the symbol timing with time resolution twice a sampling period. It is possible to decrease an operation frequency in an A/D conversion circuit even in a system requiring timing synchronization accuracy with high accuracy.

18 Claims, 15 Drawing Sheets

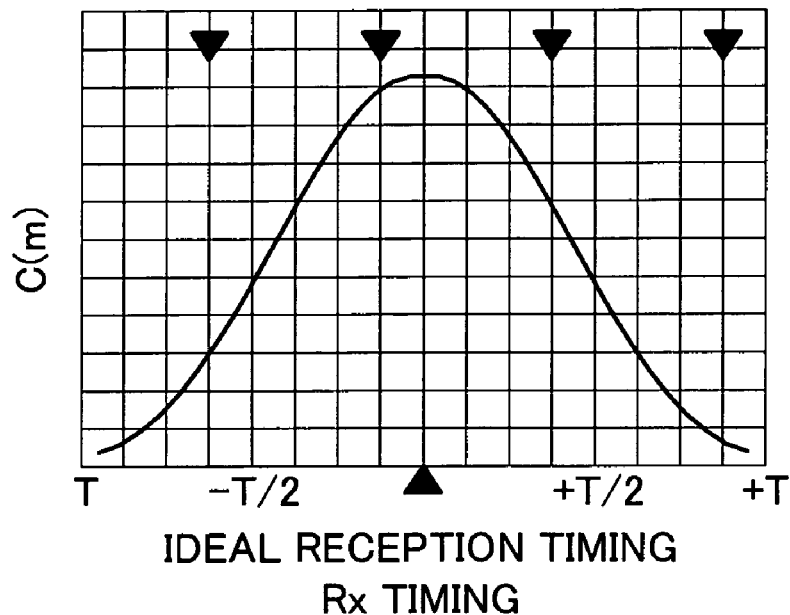
FIG.10A  EXAMPLE OF CORRELATION VALUE OBTAINED BY VECTOR OPERATION
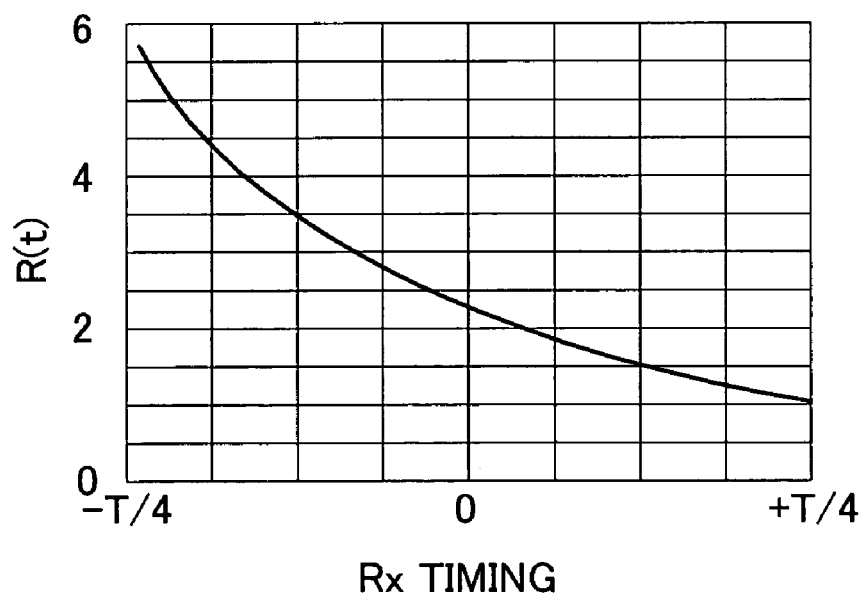
FIG.10B  EXAMPLE OF OPERATION VALUE RATIO TABLE VALUE

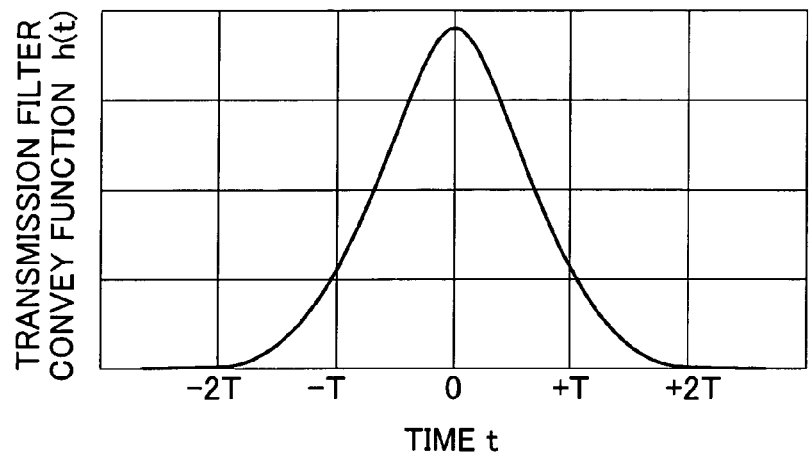
FIG.13A EXAMPLES OF TRANSMISSION BAND-PASS FILTER CARACTERISTICS INCLUDING ISI
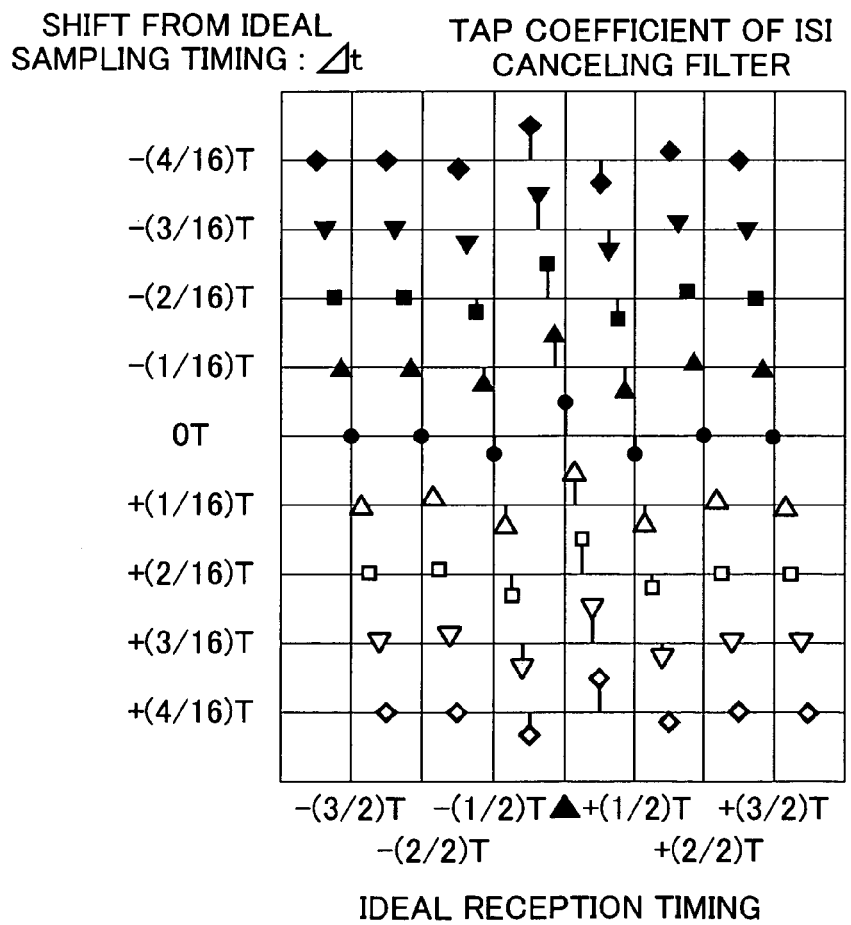
FIG.13B EXAMPLES OF OF ISI CANCELING FILTER TAP COEFFICIENTS FOR SIGNALS SAMPLED AT SHIFTED TIMINGS

RECEPTION APPARATUS AND METHOD

BACKGROUND OF THE INVENTION

1. Field of the Invention

The present invention relates to a reception apparatus and method used in a digital radio communication system.

2. Description of the Related Art

In a recent radio communication field, improvement of spectral efficiency is required, and a digital communication system has been used widely as the main current because, for example, signal processing such as error correction and data compression can be simplified and the LSI therefor is easily available. A configuration of a transmission/reception apparatus adapted to the digital communication system is disclosed in, for example, Japanese Patent Gazette S55-79541.

With reference to FIG. 1, the following explains about a basic configuration and operation of a reception section in a convention digital transmission/reception apparatus. In FIG. 1, a received digital-modulated signal is subjected to quadrature frequency conversion in quadrature detection circuit 1 to be an in-phase baseband signal (I signal) and quadrature baseband signal (Q signal). An exemplary configuration of quadrature detection circuit 1 includes mixers 11 and 12, 90-degree phase shifter 13, oscillator 14 and filters 15 and 16.

A/D conversion circuit 2 performs quantization on the I signal based on a sampling clock output from clock generating circuit 6, and outputs a quantized digital I signal. Similarly A/D conversion circuit 3 performs quantization on the Q signal based on the sampling clock, and outputs a quantized digital Q signal. It is assumed in this example that the sampling clock is provided at a frequency integer times the symbol rate.

Timing estimating circuit 4 estimates a timing of a signal point of the digital-modulated signal using the digital I and Q signals each quantized at the sampling rate integer times the symbol rate. Digital demodulation circuit 5 performs demodulation using sampled data of the I signal and Q signal each closest to the signal point among data of the quantized I and Q signals, and outputs a demodulated data sequence.

According to the above configuration, timing synchronization and digital demodulation is performed using digital values quantized in A/D conversion circuits 2 and 3, and thereby a demodulated result is obtained. Adopting the above configuration makes it possible to perform digital processing in all the sections after A/D conversion circuits 2 and 3, and therefore provides a merit that the LSI therefor is easily available.

As the ratio (hereinafter referred to as oversampling number) of the frequency of sampling clock provided to A/D conversion circuits 2 and 3 to the symbol rate is increased, the provability that sampling is performed at a point close to an ideal signal point becomes higher. Accordingly an increased oversampling number enables timing estimating circuit 4 to perform timing estimation with high accuracy, and thereby improves reception sensitivity performance in digital demodulation circuit 5.

However the increased oversampling number requires high operation performance in A/D conversion circuits 2 and 3, thereby increasing current consumption and also increasing the cost. Therefore the oversampling number is usually determined in consideration of a balance of required specification, cost and others in each communication system.

Further in the case where the conventional digital transmission/reception apparatus illustrated in FIG. 1 is applied as a terminal in a communication system requiring transmission/reception timing with extremely high accuracy, it is necessary for a terminal side to acquire timing synchronization with high accuracy on a downlink digital-modulated signal transmitted from a base station side in the system, and to determine a timing of uplink transmission based on the obtained timing information. In order to perform the timing synchronization with high accuracy, it is generally necessary to set the oversampling number in the A/D conversion circuit to be large. For example, in the case of a communication system requiring timing accuracy of $\pm\frac{1}{32}$ times the symbol duration, the oversampling number equal to or more than 32 times the symbol rate is required in the A/D conversion circuit. This condition introduces excessive performance for an ordinary digital demodulator to obtain sufficient reception sensitivity performance, and provides demerits such as increased current consumption and increased cost in a configuration of the terminal.

Meanwhile a recently increased transmission rate in communications makes it impossible to greatly increase the ratio of the sampling rate in the A/D conversion circuit to the symbol rate. In this case, demodulation in reception is performed using a signal sampled at a timing shifted from an ideal reception timing. For example, in the case where demodulation in reception is performed while sampling a digital-modulated signal transmitted with a Nyquist filter at an oversampling rate twice the symbol rate, the demodulation in reception is performed using a signal sampled at a timing shifted maximum $\pm\frac{1}{4}T$ with respect to the ideal reception timing, i.e., timing of a Nyquist point.

Thus in order to increase the timing estimation accuracy, such a method is considered that increases the sampling rate in the A/D conversion circuit. This method however causes power consumption and circuit scale in the terminal both to be increased.

SUMMARY OF THE INVENTION

It is a first object of the present invention to decrease a sampling rate in an A/D conversion circuit or D/A conversion circuit in a digital transmission/reception apparatus to be lower than a level required for an accuracy specification in a system, and thereby decrease current consumption and cost in a terminal.

This object is achieved by a digital reception apparatus having a quadrature frequency conversion section that performs quadrature frequency conversion on an input digital-modulated signal and outputs a baseband in-phase signal (I signal) and quadrature signal (Q signal), first and second analog-digital (A/D conversion) sections that each quantizes an input signal at each sampling timing and outputs a quantized digital signal, a timing estimating section that estimates a symbol timing of the digital-modulated signal and outputs a timing estimated result, a digital demodulation section that demodulates the digital-modulated signal using the digital I and Q signals and outputs a demodulation result, a clock generating section that generates a clock signal integer times the symbol rate of the digital-modulated signal while switching a phase of the clock signal with a phase difference of 180 degrees corresponding to a phase control signal to output as a sampling clock signal, a clock phase control section that generates the phase control signal for use in switching the phase of the clock signal periodically and alternately with the phase difference of 180 degrees, and a high-accuracy timing estimating section that performs timing estimation with time resolution twice the original sampling rate using the timing estimated result in the timing estimating section, and outputs a timing estimated result with high accuracy.

According to this configuration, it is possible to decrease a sampling frequency in the A/D conversion section or D/A conversion section in the digital transmission/reception apparatus to be lower than a frequency corresponding to a resolution of timing accuracy required in the system, and thereby decrease current consumption and cost in the terminal.

Further it is a second object of the present invention to enable reception timing to be estimated with higher accuracy without increasing a sampling rate in the A/D conversion section in a digital radio apparatus, and thereby increase reception performance and decrease current consumption and cost in the terminal.

This object is achieved by a digital reception apparatus having a received signal buffer for use in buffering digital I and Q signals, a known vector table which has beforehand stored complex conjugate vector sequences of vector sequences to be obtained in the case where sampling is performed at an interval of a known symbol sequence at ideal reception timings and which is read out when necessary, a vector operation section that performs vector operation corresponding to a correlation degree between input two vector sequences at each sampling timing to output the operation result, an operation result buffer for use in buffering the vector operation result, a low-accuracy timing estimating section that estimates the reception timing with accuracy equivalent to the oversampling rate to output as a timing estimated result with low accuracy, and a high-accuracy timing estimating section that estimates the reception timing with accuracy higher than the oversampling rate, using the vector operation result at a timing around the timing estimated in the low-accuracy timing estimating section.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 10A is a diagram illustrating examples of calculated results in the reception apparatus according to the sixth embodiment of the present invention;

FIG. 10B is a diagram illustrating examples of calculated results in the reception apparatus according to the sixth embodiment of the present invention;

FIG. 13A is a diagram illustrating transmission band-pass filter characteristics according to the seventh embodiment of the present invention;

FIG. 13B is a diagram illustrating ISI canceling filter tap coefficients in the reception apparatus according to the sixth embodiment of the present invention;

DETAILED DESCRIPTION OF THE PREFERRED EMBODIMENTS

Embodiments of the present invention will be described below with reference to accompanying drawings.

Each of first to fifth embodiments explains about a case that a sampling rate in an A/D conversion circuit is decreased to be lower than a level required for an accuracy specification in a system while maintaining reception accuracy, thereby decreasing current consumption and cost in a terminal.

First Embodiment

This embodiment explains about a case that sampling is first performed at a predetermined sampling rate, and then the sampling is performed at the same sampling rate while shifting a phase, thereby performing timing estimation. It is thereby possible to obtain timing estimation accuracy the same as that obtained in performing the sampling at a sampling rate integer times the predetermined sampling rate, and further to decrease the current consumption and cost.

Figure 2:
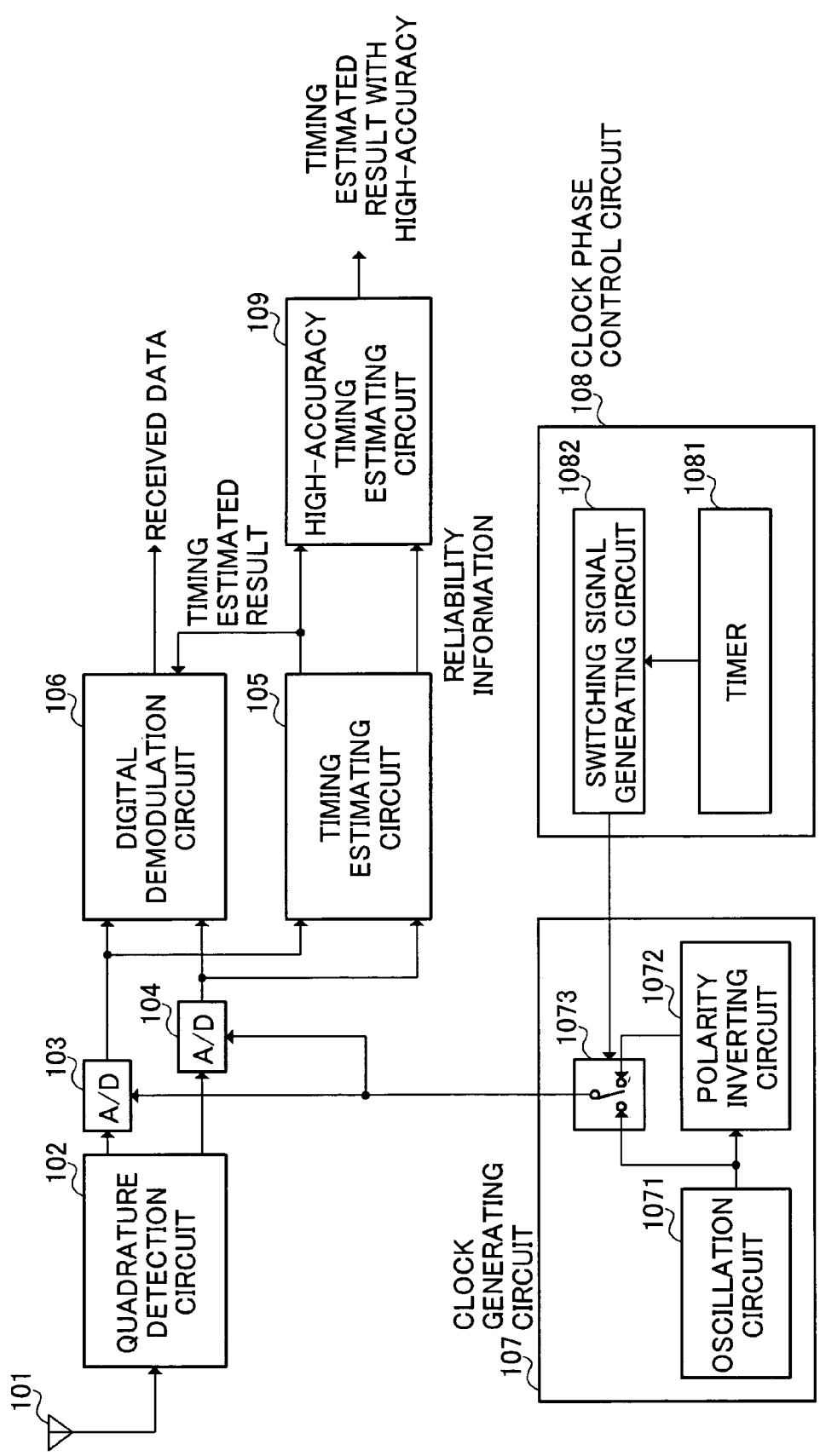
FIG. 2 is a block diagram illustrating a configuration of a communication terminal apparatus provided with a reception apparatus according to a first embodiment of the present invention.

FIG. 2 is a block diagram illustrating a configuration of a communication terminal apparatus provided with a reception apparatus according to the first embodiment of the present invention. In FIG. 2, a reception series is only illustrated, and a transmission series is omitted.

Figure 1:
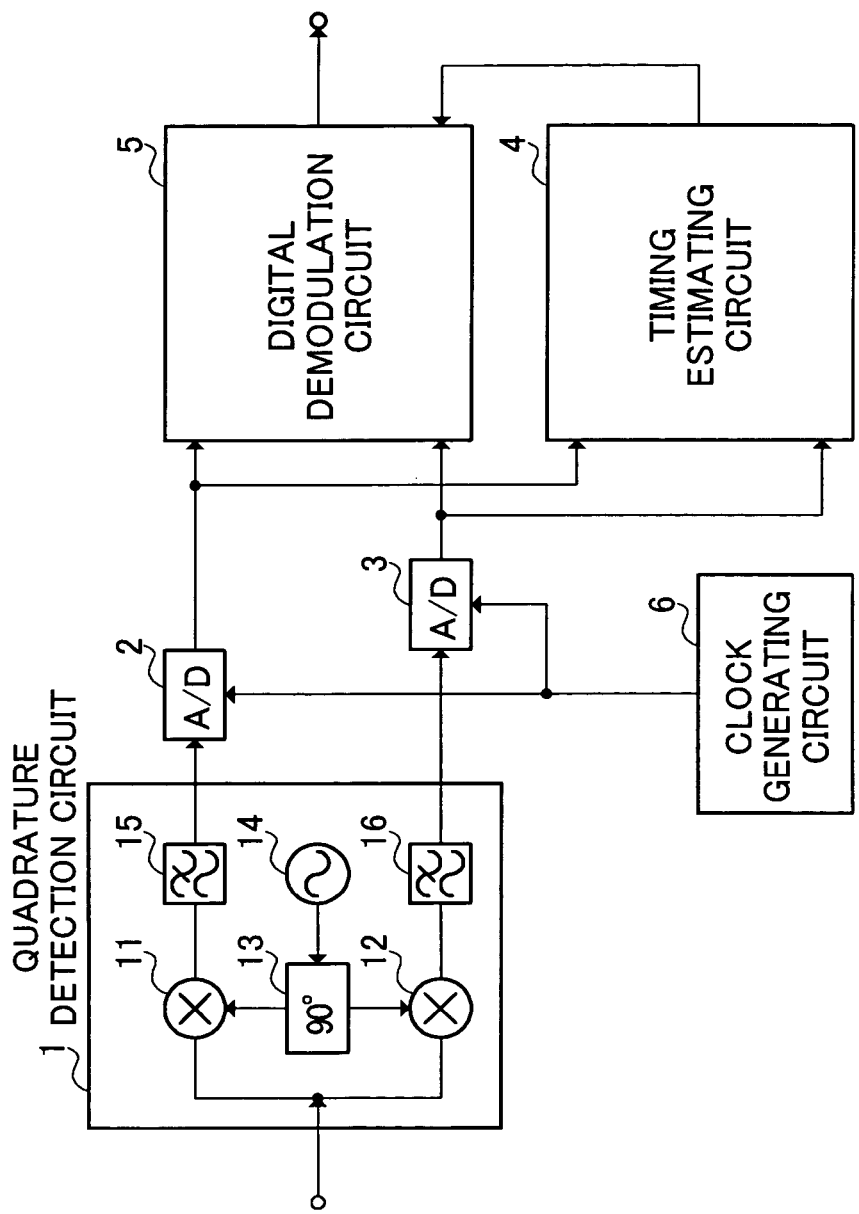
FIG. 1 is a block diagram illustrating a configuration of an example of a conventional receiver.

In the communication terminal apparatus illustrated in FIG. 2, a downlink signal (received signal) transmitted from a base station apparatus is received in quadrature detection circuit 102 via antenna 101. Quadrature detection circuit 102 performs quadrature frequency conversion on the received signal (digital-modulated signal) to obtain a baseband in-phase signal (I signal) and quadrature signal (Q signal), and outputs the I signal and Q signal respectively to A/D conversion circuits 103 and 104. Quadrature detection circuit 102 is configured, for example, as quadrature detection circuit 1 illustrated in FIG. 1. This embodiment is not limited to any particular modulation method for the digital-modulated signal. Further it is assumed that the received signal is given predetermined radio reception processing such as frequency conversion, amplification and canceling of signals of unnecessary frequency band (filtering), and is already set to have an appropriate input level and frequency band, before being input to quadrature detection circuit 102.

A/D conversion circuit 103 quantizes the I signal based on a sampling clock to obtain a digital I signal, and outputs a quantized digital I signal to digital demodulation circuit 106 and timing estimating circuit 105. A/D conversion circuit 104 has the same configuration as A/D conversion circuit 103, quantizes the Q signal, and outputs a quantized digital Q signal to digital demodulation circuit 106 and timing estimating circuit 105. This embodiment is not limited to any particular conversion method and bit resolution in each of A/D conversion circuits 103 and 104 as long as those are determined according to system specifications.

Timing estimating circuit 105 estimates a symbol timing of the digital-modulated signal using the digital I signal and digital Q signal, and outputs a timing estimated result to digital demodulation circuit 106 and high-accuracy timing estimating circuit 109. At this point, timing estimating circuit 105 outputs a position of a sampled point closest to an ideal signal point among a plurality of sampled points in a symbol.

Digital demodulation circuit 106 performs digital demodulation using the digital I and Q signals based on the timing estimated result, and outputs a demodulated result (received data). This embodiment is not limited to any particular demodulation method.

Clock generating circuit 107 generates a clock signal integer times a symbol rate of the digital-modulated signal, while switching a phase of the clock signal by 180 degrees corresponding to a phase control signal. For example, clock generating circuit 107 is comprised of oscillation circuit 1071 that generates the clock signal as a reference, polarity inverting circuit 1072 that inverts a polarity of the reference clock signal output from oscillation circuit 1071 and outputs an inverted clock signal with a 180 degrees phase shift, and switch 1073 that selects either of the reference clock signal and inverted clock signal corresponding to the phase control signal to output. In addition it is assumed in this embodiment that a frequency of the clock signal is set to be 8 times the symbol rate as an example.

Clock phase control circuit 108 generates the phase control signal for use in periodically and alternately switching the phase of the clock signal generated in clock generating circuit 107. For example, clock phase control circuit 108 is comprised of timer 1081 that outputs a trigger signal periodically, and switching signal generating circuit 1082 that generates the phase control signal for use in switching switch 1073 corresponding to the trigger signal output from timer 1081 to output to switch 1073.

It is assumed herein that a time interval for switching the phase is sufficiently long with respect to a symbol duration, and determined as appropriate depending on systems. For example, when the digital-modulated signal is transmitted per burst basis in a time division multiple access communication system, the time interval is set to be an interval of a burst or a few bursts. More specifically when desired reception accuracy should be maintained under an environment with many noises, it is necessary to adopt a large number of samples to reserve an data amount required for the timing estimation, and therefore the time interval for switching the phase is set to be relatively long. On the other hand when the desired reception accuracy is maintained under an environment with a few noises, it may be possible to set the time interval for switching the phase to be the interval of a burst or an interval less than a burst.

High-accuracy timing estimating circuit 109 performs timing estimation with time resolution twice the sampling rate by using timing estimated results obtained in timing estimating circuit 105 at respective intervals during which the clock signal has the phase of 0 degree and has the phase of 180 degrees, and outputs a timing estimated result with high accuracy. This embodiment adopts a constitution where high-accuracy timing estimating circuit 109 selects an estimated result with higher reliability among two timing estimated results obtained in the phases of 0 degree and 180 degrees.

The following explains about the reception operation of the communication terminal apparatus provided with the reception apparatus configured as described above. In addition, in the reception operation, with respect to processing for performing quadrature demodulation on an input digital-modulated signal, performing quantization in A/D conversion circuits 103 and 104 to obtain digital signals, and then performing symbol timing estimation and digital demodulation, such processing is the same as in the receiver illustrated in FIG. 1, and detailed explanations thereof are omitted.

Clock phase control circuit 108 periodically outputs the control signal for switching the phase. In clock generating circuit 107, switch 1073 is switched corresponding to the control signal, and thereby the phase of the clock signal is inverted. Clock generating circuit 107 outputs the signal whose phase is thus inverted periodically to A/D conversion circuits 103 and 104 as a sampling clock.

Timing estimating circuit 105 performs symbol timing estimation in respective cases that the clock has the phase of 0 degree and that the clock has the phase of 180 degrees. The estimation accuracy generates an error in the range of ± (sampling period/2), corresponding to the relationship between the symbol timing and clock signal phase. The error becomes ±T/16 in this embodiment. The respective symbol timing estimated results in the cases that the clock has the phase of 0 degree and has the phase of 180 degrees are output to high-accuracy timing estimating circuit 109. Further timing estimating circuit 105 outputs reliability information for use in estimating the timing in high-accuracy timing estimating circuit 109 to high-accuracy timing estimating circuit 109.

High-accuracy timing estimating circuit 109 performs timing estimation using both the timing estimated result obtained when the clock has the phase of 0 degree and the timing estimated result obtained when the clock has the phase of 180 degrees. In other words, high-accuracy timing estimating circuit 109 selects the timing estimated result with higher reliability among two timing estimated results obtained by shifting the phase of the clock using the predetermined sampling rate. At this point, high-accuracy timing estimating circuit 109 performs the timing estimation using the reliability information provided from timing estimating circuit 105. It is thereby expected to obtain estimation accuracy almost equal to that obtained in performing the timing estimation with the accuracy twice the sampling rate (in this case, ±T/32).

Figure 3:
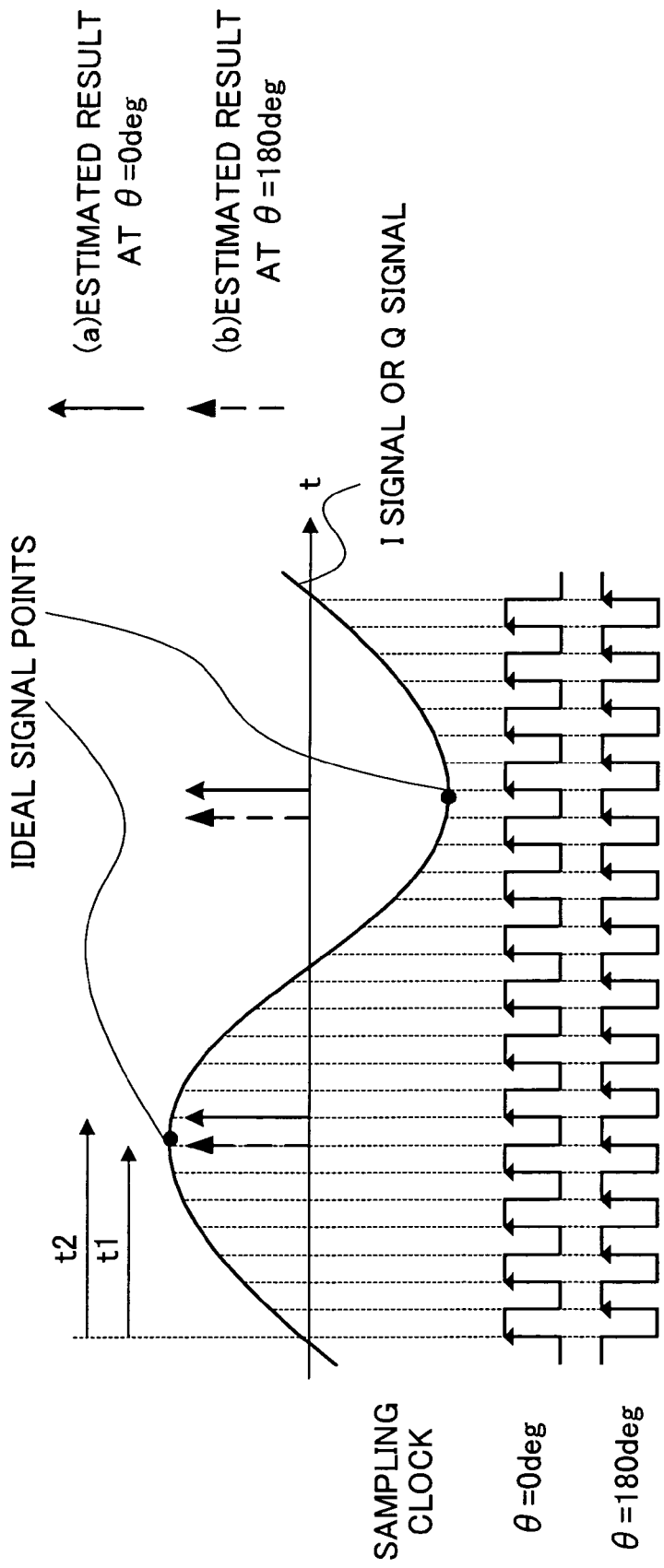
FIG. 3 is a timing chart illustrating examples of sampling timings in the reception apparatus according to the first embodiment of the present invention.

In FIG. 3, among the timing estimated result (a) when the clock has the phase of 0 degree and timing estimated result (b) when the clock has the phase of 180 degrees, the timing estimated result (b) is closer to a timing of the ideal signal point than the timing estimated result (a) when amplitude is used as the reliability information. In other words the timing estimated result (b) is the timing estimated result with higher reliability. Accordingly the timing estimated result (b) is output as the timing estimated result with high accuracy.

According to this embodiment of the present invention as described above, it is possible to estimate the symbol timing with time resolution twice the period of the sampling clock provided to A/D conversion circuits 103 and 104. Accordingly, for example, even in a system requiring timing accuracy of ±T/32, the timing accuracy can be achieved by setting the sampling clock in A/D conversion circuits 103 and 104 to be 8 times oversampling. As a result, it is possible to decrease current consumption and cost in a communication terminal apparatus.

In addition this embodiment explains about the case that clock generating circuit 107 is comprised of oscillation circuit 1071, polarity inverting circuit 1072 and switch 1073, however is not limited to the above case. It may be possible to use any configuration enabling the phase of the clock signal to be inverted corresponding to the phase control signal. Further it may be possible to adopt a phase control method with PLL (Phase-Locked Loop) control in clock generating circuit 1071.

Further this embodiment explains about the case that the phase of the clock is switched between a 0 degree phase shift and 180 degrees phase shift with respect to a referential timing, however is not limited to the above case. For example it may be possible to adopt a constitution for shifting the phase, for example, −90 degrees or +90 degrees with respect to the reference timing to switch. Furthermore it may be possible to adopt a constitution for shifting the phase between a plurality of stages (between 0 to 360 degrees) by predetermined angles (for example, 4 stages by 90 degrees or 6 stages by 60 degrees) with respect to the reference timing.

Moreover it may be possible to adopt as the reference timing the timing estimated in timing estimating circuit 105, or the timing estimated in high-accuracy timing estimating circuit 109.

Further this embodiment explains about the case that high-accuracy timing estimating circuit 109 selects the estimated result with higher reliability among two estimated results, however is not limited to the above case. It may be possible to adopt a constitution for obtaining a timewise intermediate point of the two timing estimated results (between the long dashed line arrow and short dashed line arrow in FIG. 3).

Furthermore this embodiment explains about the case that the timing estimated result with high accuracy is obtained using an amplitude value as the reliability information from among two timing estimated results obtained by sampling with the clock phase shifted, however is not limited to the above case. It may be possible to use as the reliability information a correlation value obtained by performing correlation calculation on a known signal contained in a downlink signal, for example, unique word, and select the timing estimated result with higher correlation value as the timing estimated result with high accuracy.

Second Embodiment

This embodiment explains about a case that interoperation is performed on an interval between two timing estimated results (between the short dashed line arrow and long dashed line arrow in FIG. 3) in obtaining the timing estimated result with high accuracy from the two timing estimated results obtained by sampling with the clock phase shifted.

Figure 4:
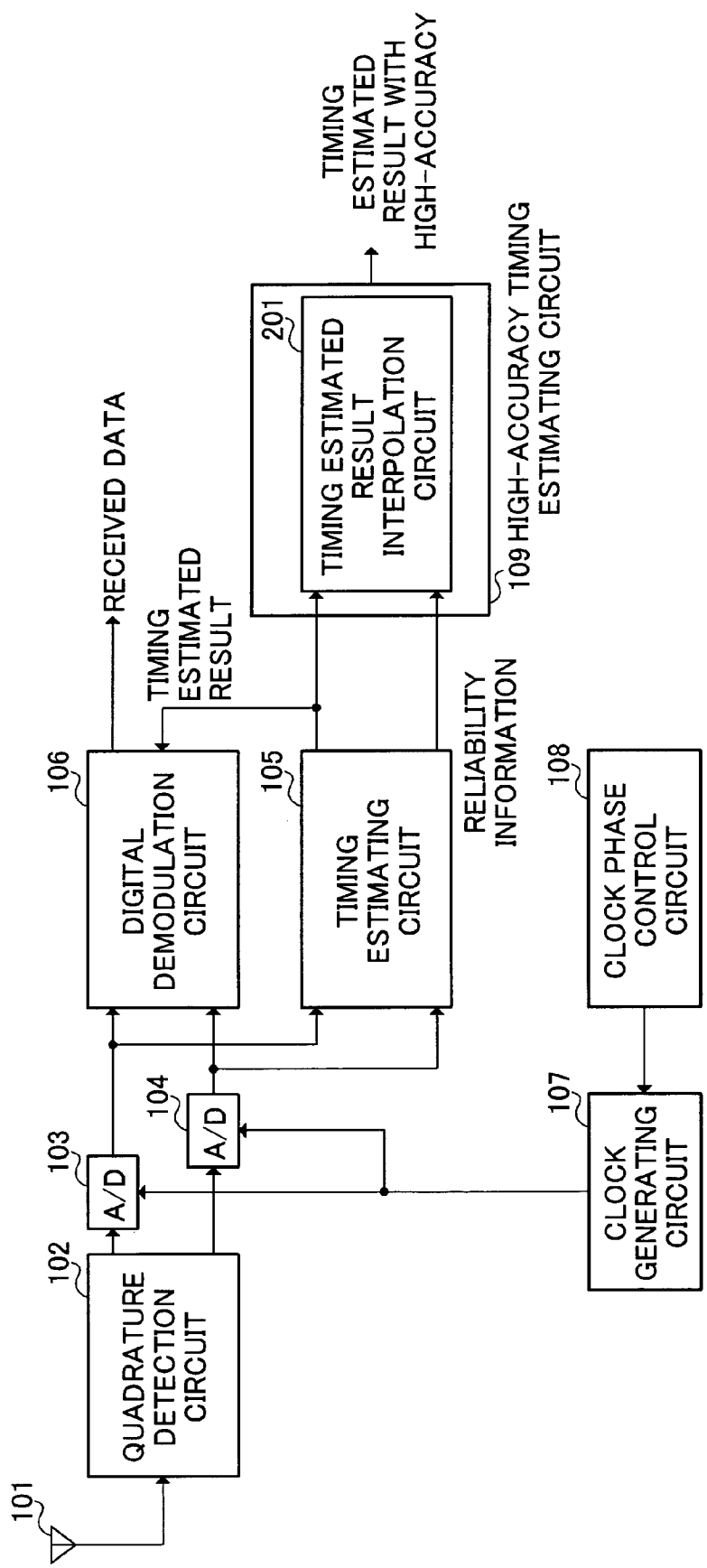
FIG. 4 is a block diagram illustrating a configuration of a communication terminal apparatus provided with a reception apparatus according to a second embodiment of the present invention.

FIG. 4 is a block diagram illustrating a configuration of a communication terminal apparatus provided with a reception apparatus according to the second embodiment of the present invention. In addition in FIG. 4, sections the same as those in FIG. 2 are given the same marks as in FIG. 2 to omit detailed explanations thereof. In FIG. 4, a reception series is only illustrated, and a transmission series is omitted.

In FIG. 4, high-accuracy timing estimating circuit 109 is provided with timing estimated result interpolation circuit 201, and timing estimated result interpolation circuit 201 operates as a high-accuracy timing estimating circuit. Timing estimated result interpolation circuit 201 performs timing estimation by interpolation using two timing estimated results estimated in timing estimating circuit 105 and reliability information thereof.

The following explains about the reception operation in the communication terminal apparatus provided with the reception apparatus configured as described above.

A timing estimated result obtained in timing estimating circuit 105 in the case where the clock has the phase of some degrees (assumed to be 0 degree in this case) is assumed to be t1 and the reliability information thereof is assumed to be c1. Further another timing estimated result obtained in timing estimating circuit 105 in the case where the time the clock has the phase of another some degrees (assumed to be 180 degrees in this case) is assumed to be t2 and the reliability information thereof is assumed to be c2.

At this point, as illustrated in FIG. 3, the timing estimated results t1 and t2 are assumed to be each indicative of a time from a sampled point closest to a timing at which a symbol is switched. Timing estimating circuit 105 outputs the obtained timing estimated results t1 and t2 and reliability information c1 and c2 to timing estimated result interpolation circuit 201.

A digital-modulated signal is assumed to be a BPSK modulated signal. Further it is assumed that timing estimation in timing estimated circuit 105 is performed by obtaining a point with an amplitude value being maximum among sampled points in a symbol, and that the reliability information c1 and c2 are each indicative of the amplitude value. Timing estimated result to by the interpolation in timing estimated result interpolation circuit 201 is obtained using the following equation (1).

$$t0=(c1 \times t1+c2 \times t2)/(c1+c2) \qquad \text{eq.(1)}$$

By performing the high-accuracy timing estimation using the equation (1), the estimated result is obtained which is an intermediate point between the two timing estimated results t1 and t2 when two reliability information c1 and c2 are almost equal, and the estimated result is obtained which is closer to the timing estimated result with higher reliability when there is a difference between the reliability information.

According to this embodiment of the present invention as described above, the timing estimation is performed by the interpolation using the two timing estimated results obtained at clocks with different phases, and thereby it is possible to perform the timing estimation with time resolution finer than the sampling clock period and with high accuracy.

In addition this embodiment explains about the case that the BPSK modulated signal is used as the digital-modulated signal, and that timing estimating circuit 105 obtains the sampled point with the maximum amplitude, however is not limited to the above case. It may be possible to adopt a timing estimating circuit corresponding to a digital modulation method.

Further this embodiment explains about the case that the amplitude value is used as the reliability information, however is not limited to the above case. For example it may be possible to use as the reliability information an error amount between a phase value at a sampled point selected as a symbol timing and an ideal phase value, or a correlation value obtained by performing correlation calculation on a known signal contained in a downlink signal, for example, unique word.

Third Embodiment

Figure 5:
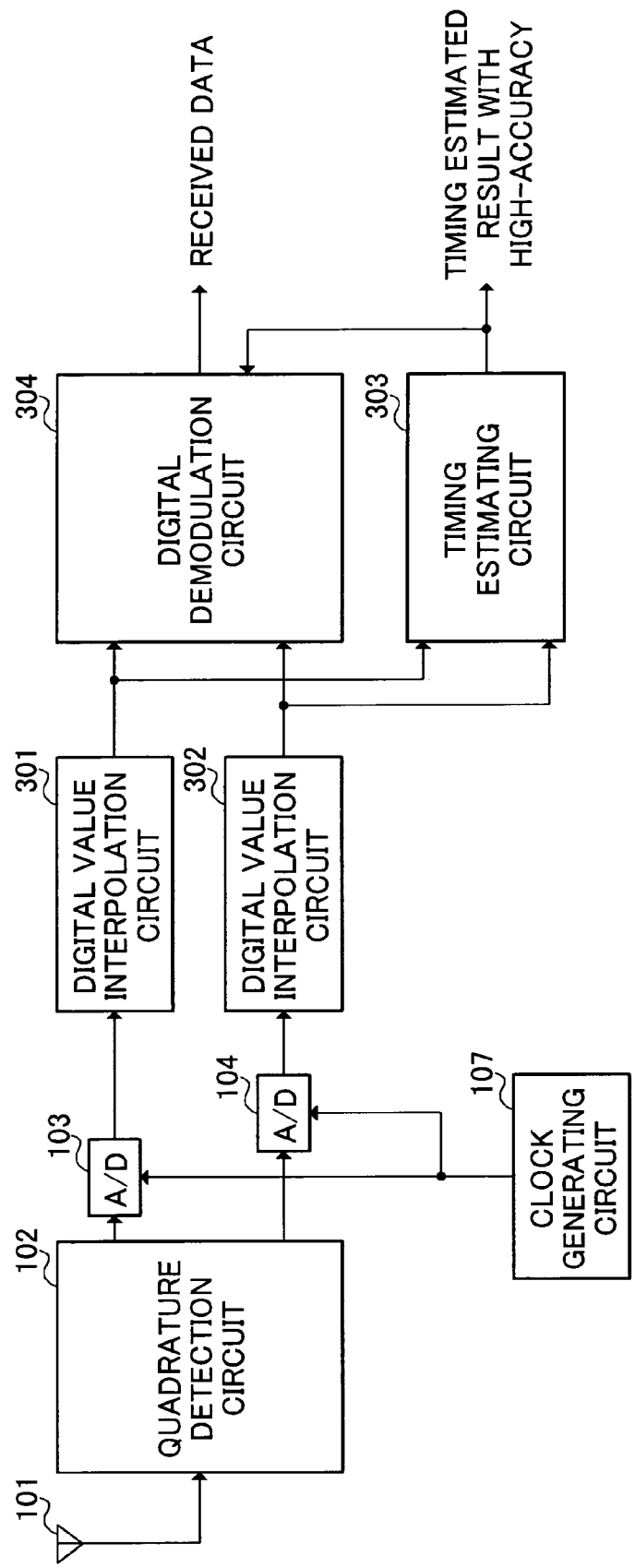
FIG. 5 is a block diagram illustrating a configuration of a communication terminal apparatus provided with a reception apparatus according to a third embodiment of the present invention.

This embodiment explains about a case that timing estimation is performed by interpolating values sampled at a predetermined sampling rate. FIG. 5 is a block diagram illustrating a configuration of a communication terminal apparatus provided with a reception apparatus according to the third embodiment of the present invention. In FIG. 5, sections the same as those in FIG. 2 are given the same marks as in FIG. 2 to omit detailed explanations thereof. In addition in FIG. 5, a reception series is only illustrated, and a transmission series is omitted.

The communication terminal apparatus illustrated in FIG. 5 is provided with digital value interpolation circuits 301 and 302, timing estimating circuit 303 instead of timing estimating circuit 105 and high-accuracy timing estimating circuit 109, digital demodulation circuit 304 instead of digital demodulation circuit 106, and no clock phase control circuit 108. The other configuration and operations are the same as those illustrated in FIG. 2.

Digital value interpolation circuits 301 generates an interpolated digital value by the interpolation using two successive sampled values output from A/D conversion circuit 103, inserts the interpolated sampled value between the two sampled values, and outputs the resultant as an interpolated digital I signal to timing estimating circuit 303 and digital demodulation circuit 304. Digital value interpolation circuit 302 receives sampled values output from A/D conversion circuit 104, performs the same operation as in digital value interpolation circuit 302, and outputs an interpolated digital Q signal to timing estimating circuit 303 and digital demodulation circuit 304.

Timing estimating circuit 303 performs the timing estimation using the interpolated digital I and Q signals each having the sampling number twice that in timing estimating circuit 105 illustrated in FIG. 2, and outputs the timing estimated result to digital demodulation circuit 304 while outputting the timing estimated result as a timing estimated result with high accuracy. Digital demodulation circuit 304 performs digital demodulation using the interpolated digital I and Q signals based on the timing estimated result with high accuracy output from timing estimating circuit 303, and outputs a demodulated result (received data).

The following explains about the reception operation of the communication terminal apparatus with the configuration as described above.

Figure 6:
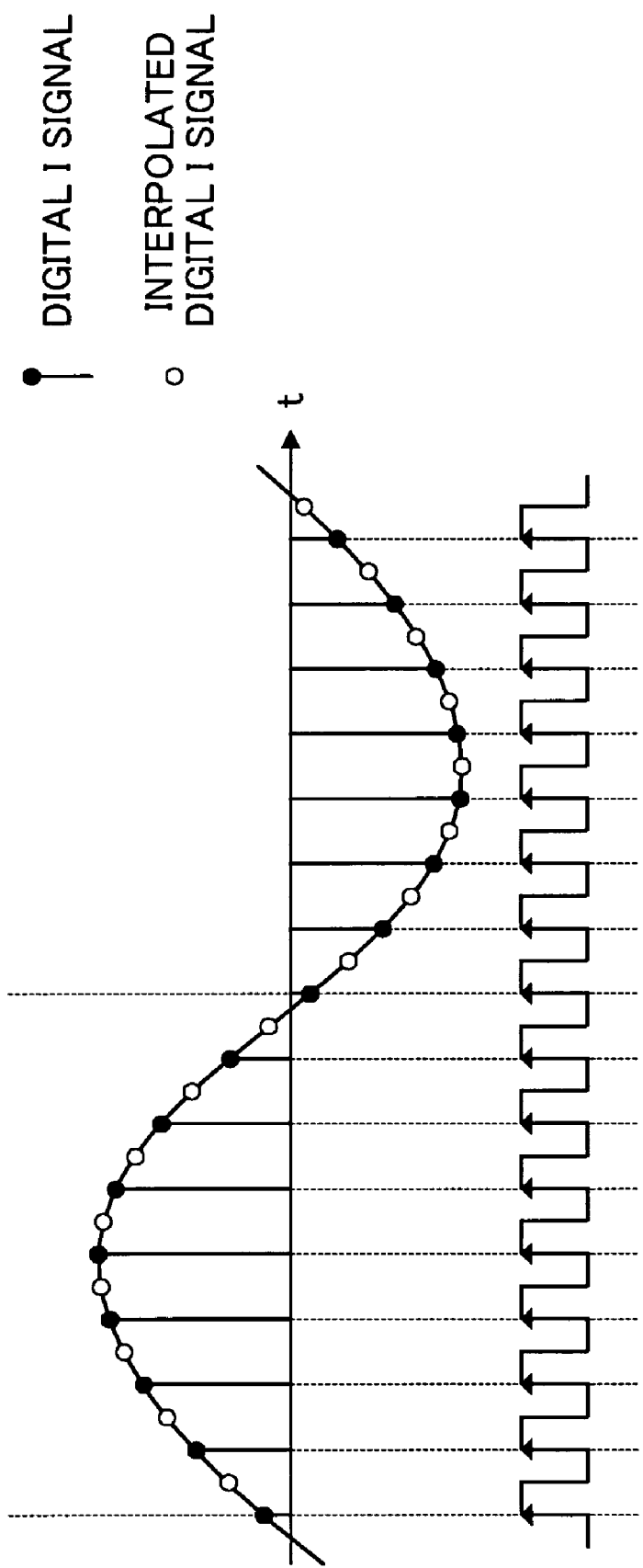
FIG. 6 is a timing chart illustrating examples of sampling timings and interpolated digital values in the reception apparatus according to the third embodiment of the present invention.

Digital interpolation circuits 301 and 302 use respective sampled values (block dots in FIG. 6) of the digital I and Q signals output from A/D conversion circuits 103 and 104, respectively, obtain respective interpolated values (white dots in FIG. 6) of corresponding successive two samples, insert the respective interpolated values between the two sampled values, and respectively output the interpolated digital I and Q signals each with the sampling number twice the original one.

At this point, when I and Q values of successive two samples at a time (t=k) are assumed to be {I(k),Q(k)} and {I(k+1),Q(k+1)}, interpolated digital I and Q values {I',Q'} are obtained using the equations (2) to (5).

$$I'(2k)=I(k) \qquad \text{eq.(2)}$$

$$Q'(2k)=Q(k) \qquad \text{eq.(3)}$$

$$I'(2k+1)=\{I(k)+I(k+1)\}/2 \qquad \text{eq.(4)}$$

$$Q'(2k+1)=\{Q(k)+Q(k+1)\}/2 \qquad \text{eq.(5)}$$

Since this interpolation processing is linear interpolation, it is not possible to obtain real I and Q values, but it is possible to estimate the I and Q signals each of an extent including a negligible error.

Timing estimating circuit 303 and digital demodulation circuit 304 respectively performs timing estimation and digital demodulation both using sample data that is increased to be twice the original by the interpolation processing.

According to this embodiment of the present invention as described above, it is possible to perform the timing estimation and digital demodulation with accuracy almost equal to that in the case where the sampling clock frequency is increased to be twice, possible to decrease the sampling frequency in the A/D conversion circuit as compared to the conventional case, and possible to reduce current consumption and cost of the receiver.

In addition this embodiment explains about the case that the linear interpolation (quadratic interpolation) using successive two sampled values is employed as the interpolation processing, however is not limited to the above case. It may be possible to use high-order interpolation processing using a plurality of sampled values to further increase the accuracy of the interpolation processing.

Further this embodiment explains about the case that the sampling clocks output to A/D conversion circuits 103 and 104 have the same phase, however is not limited to the above case. For example it may be possible to set the phases of the clocks provided to the circuits to be shifted 180 degrees with respect to each other. It is thereby possible to perform sampling at a timing closer to an ideal signal point even when either of I and Q signals is used, enabling timing estimation and digital demodulation to be performed with higher accuracy.

Fourth Embodiment

This embodiment explains about a case of controlling an operation period in performing timing estimation while shifting the phase.

Figure 7:
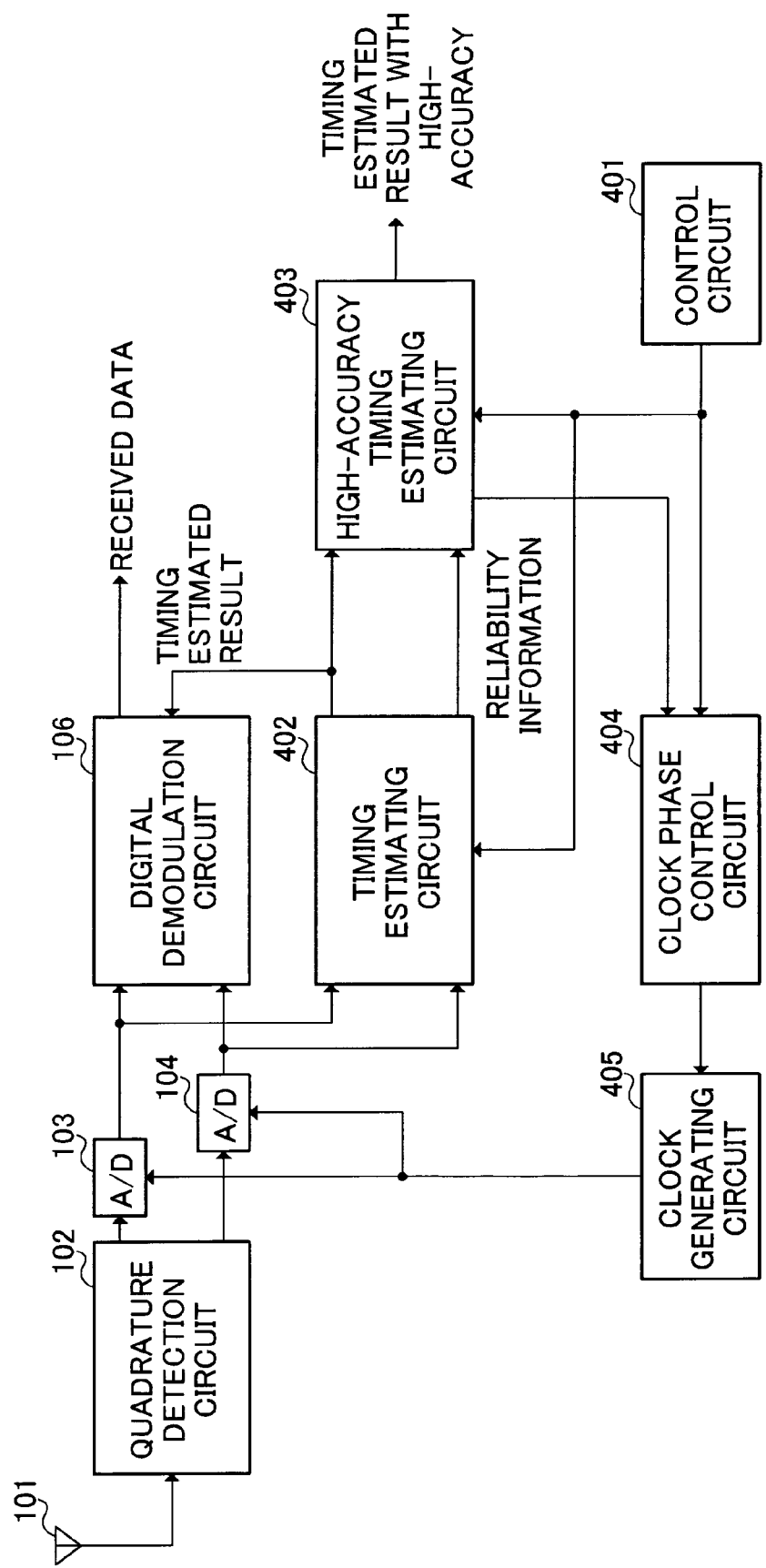
FIG. 7 is a block diagram illustrating a configuration of a communication terminal apparatus provided with a reception apparatus according to a fourth embodiment of the present invention.

FIG. 7 is a block diagram illustrating a configuration of a communication terminal apparatus provided with a reception apparatus according to the fourth embodiment of the present invention. In FIG. 7, sections the same as those in FIG. 2 are given the same marks as in FIG. 2 to omit detailed explanations thereof. In addition in FIG. 7, a reception series is only illustrated, and a transmission series is omitted.

In the configuration illustrated in FIG. 7, control circuit 401 outputs two kinds of mode signals of an operation mode and non-operation mode to timing estimating circuit 402, high-accuracy timing estimating circuit 403 and clock phase control circuit 404. It is assumed in this embodiment that the two kinds of mode signals are switched alternately and periodically at predetermined intervals that are sufficiently longer than a burst length, for example, every a few tens of bursts.

The following explains about the reception operation of the communication terminal apparatus with the configuration as described above. The operation performed during the time the operation mode signal is output from control circuit 401 is the same as that in the communication terminal apparatus illustrated in FIG. 2. Accordingly herein explained is the operation performed during the time the non-operation mode signal is output from control circuit 401.

In timing estimating circuit 402 and high-accuracy timing estimating circuit 403, when the non-operation mode signal is provided, the operation for timing estimation is not performed, and therefore an estimated result is not output. In clock phase control circuit 404, when the non-operation mode signal is provided, the circuit 404 outputs to clock generating circuit 405 a phase control signal used to fix a phase of the clock to the phase with which the timing estimated result with high accuracy was selected in high-accuracy timing estimating circuit 403 in a previous operation mode.

Thus the operation mode in which the timing estimation is performed while shifting the phase and the non-operation mode in which such an operation is not performed are switched as appropriate. In other words, the control is performed so that the operation mode is applied only when the timing estimated result with high accuracy is required, and once the timing estimation with high accuracy is completed, the timing is locked to the estimated timing as the non-operation mode, whereby it is possible to perform the timing estimation with high accuracy more efficiently.

According to this embodiment of the present invention as descried above, since in the non-operation mode, the phase of the sampling clock is fixed based on the timing estimated result with high accuracy obtained in the operation mode, it is possible to perform more accurate digital demodulation.

In addition this embodiment explains about the case that control circuit 401 performs the switching of the operation mode signal and non-operation mode signal periodically every a few tens of bursts, however is not limited to the above case. It may be possible to set a switching interval to be a long term when stability of the clock is high in the reception apparatus and the system. Further it is not necessary that the interval of the operation mode is equal to that of the non-operation mode, and it may be possible to set the interval of the non-operation mode to be extremely longer than that of the operation mode. Furthermore it may be possible that the operation mode is set only at the time power is supplied to a reception circuit or at the initial time to acquire synchronization with the system, and that once the synchronization is acquired, the mode is fixed to the non-operation mode. Moreover it may be possible to adopt a constitution that supervises the reliability information in timing estimating circuit 402 to change the mode to the operation mode only when the reliability deteriorates.

Fifth Embodiment

This embodiment explains about a case that transmission operation (transmission processing) is performed using the timing with high accuracy obtained as described in the above embodiments.

Figure 8:
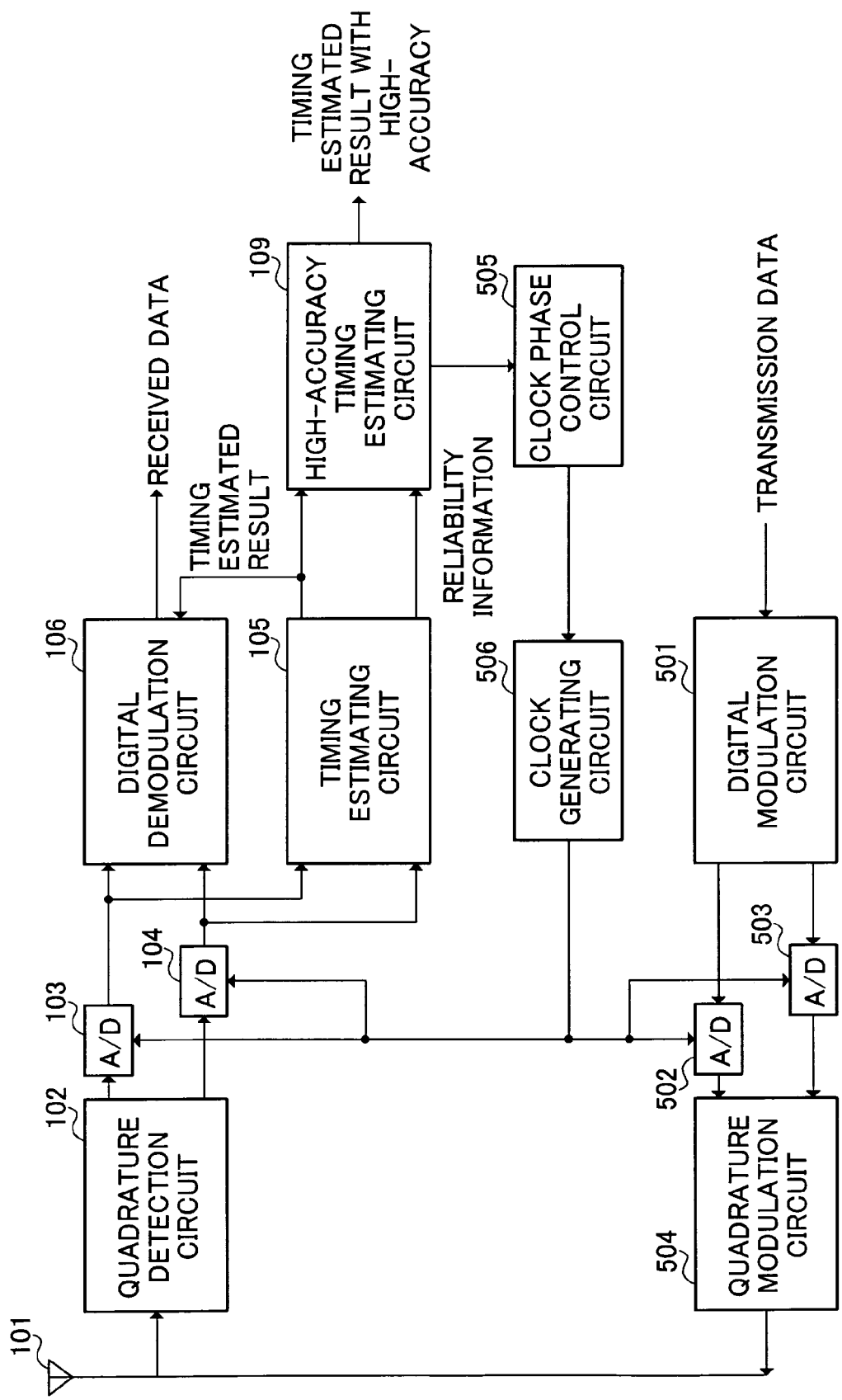
FIG. 8 is a block diagram illustrating a configuration of a communication terminal apparatus provided with a transmission/reception apparatus according to a fifth embodiment of the present invention.

FIG. 8 is a block diagram illustrating a configuration of a communication terminal apparatus provided with a transmission/reception apparatus according to the fifth embodiment of the present invention. In FIG. 8, digital modulation circuit 501 performs digital modulation on transmission data, and generates a transmission digital I signal and transmission digital Q signal. This embodiment is not limited to any particular modulation method.

D/A conversion circuit 502 converts the transmission digital I signal into an analog signal for each sampling clock to output. D/A conversion circuit 503 converts the transmission digital Q signal into an analog signal for each sampling clock to output. Quadrature modulation circuit 504 performs quadrature modulation using the analog I signal and Q signal, and outputs a digital-modulated signal.

Clock phase control circuit 505 and clock generating circuit 506 respectively perform the same operations as clock phase control circuit 108 and clock generating circuit 107 in FIG. 2 when the circuits receive the digital-modulated signal. Further when the digital-modulated signal is transmitted, clock phase control circuit 505 outputs to clock generating circuit 506 a phase control signal used to obtain the timing estimated result with high accuracy estimated in high-accuracy timing estimating circuit 109, and based on the phase control signal, clock generating circuit 506 outputs the clock signal to D/A conversion circuits 502 and 503 as a sampling clock. The other configuration and operations in the communication terminal apparatus illustrated in FIG. 8 are the same as those in the communication terminal apparatus illustrated in FIG. 2.

The following explains about transmission and reception operations of the communication terminal apparatus with the configuration as described above. In addition the operations for performing reception, demodulation and high-accuracy timing estimation in the communication terminal apparatus illustrated in FIG. 8 are the same as those in the communication terminal apparatus illustrated in FIG. 2. Accordingly the following explains about the transmission operation.

Digital modulation circuit 501 performs digital modulation on transmission data, and outputs a transmission digital I signal and transmission digital Q signal respectively to D/A conversion circuits 502 and 503. D/A conversion circuits 502 and 503 convert the transmission digital signals into respective analog signals. In this conversion, a sampling clock is provided from clock generating circuit 506. In this case, the phase of the sampling clock is set to be synchronized with the timing estimated result with high accuracy estimated in receiving the digital-modulated signal in high-accuracy timing estimating circuit 109.

Specifically clock phase control circuit 505 outputs the phase control signal to clock generating circuit 506 so as to set the phase of the clock to the phase for the estimated result selected in high-accuracy timing estimating circuit 109 among the timing estimated result at the time the clock has the phase of 0 degree and the timing estimated result at the time the clock has the phase of 180 degrees obtained in timing estimating circuit 105. Based on the phase control signal, clock generating circuit 506 outputs the clock signal with the controlled phase to D/A conversion circuits 502 and 503. The analog I and Q signals converted respectively in D/A conversion circuits 502 and 503 are subjected to quadrature modulation in quadrature modulation circuit 504. The transmission signal is subjected to the predetermined transmission processing, and then transmitted as an uplink signal to a base station apparatus via antenna 101.

According to this embodiment of the present invention as described above, the phase of the sampling clock in transmission is determined based on the result of high-accuracy timing estimation performed in reception to perform transmission processing, whereby it is possible to decrease a rate of the sampling clock to be provided to the D/A conversion circuits with respect to accuracy of transmission timing required in the system, thereby enabling decreased current consumption and cost in the terminal.

In addition this embodiment explains about the case that the reception series is comprised of the configuration illustrated in FIG. 2, however is not limited to the above case. It may be possible to apply the configuration illustrated in FIG. 4, FIG. 5 or FIG. 7 to that of the receiver.

The following sixth to ninth embodiments each explains a case enabling a reception timing to be estimated with higher accuracy without increasing the sampling rate in the A/D conversion circuit, and thereby decreasing the current consumption and cost in the terminal.

Sixth Embodiment

This embodiment explains about a case that rough timing estimation (with low accuracy) is first performed at a predetermined sampling rate, and then timing estimation with high accuracy (fine adjustment) is performed based on a correlation value ratio of known signals between different samples sampled at the predetermined sampling rate. In this case the correlation value ratio of the known signals between the samples are obtained in advance.

Figure 9:
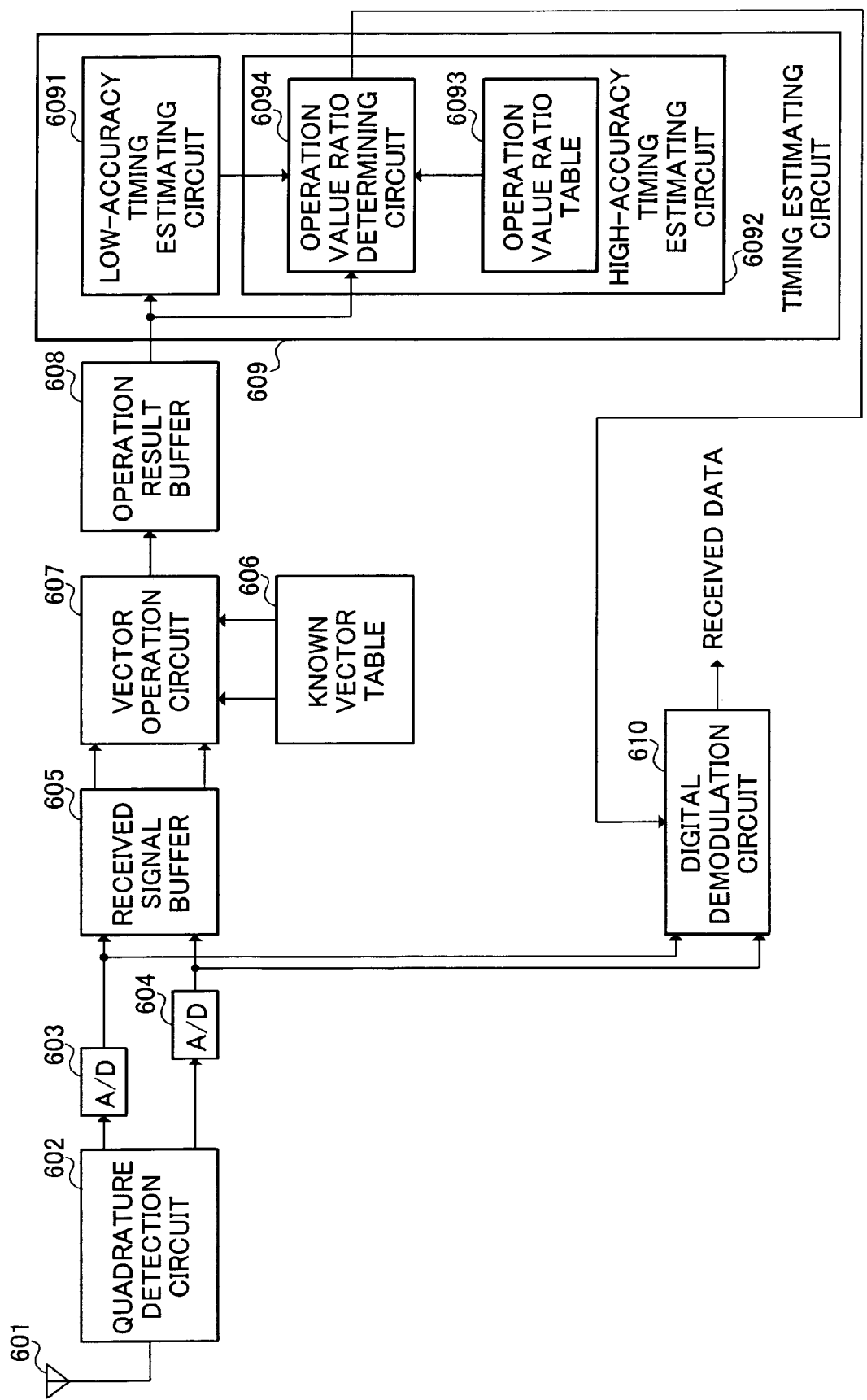
FIG. 9 is a block diagram illustrating a configuration of a communication terminal apparatus provided with a reception apparatus according to a sixth embodiment of the present invention.

FIG. 9 is a block diagram illustrating a configuration of a communication terminal apparatus provided with a reception apparatus according to the sixth embodiment of the present invention. In FIG. 9, a reception series is only illustrated, and a transmission series is omitted.

In the communication terminal apparatus illustrated in FIG. 9, a downlink signal (received signal) transmitted from a base station apparatus is received in quadrature detection circuit 602 via antenna 601. Quadrature detection circuit 602 performs quadrature frequency conversion on the received signal (digital-modulated signal) to obtain a baseband in-phase signal (I signal) and quadrature signal (Q signal), and outputs the I signal and Q signal respectively to A/D conversion circuits 603 and 604. Quadrature detection circuit 602 is configured, for example, as quadrature detection circuit 1 illustrated in FIG. 1. This embodiment is not limited to any particular modulation system for the digital-modulated signal. Further it is assumed that the received signal is given predetermined radio reception processing such as frequency conversion, amplification and removing of signals of unnecessary frequency band (filtering), and is already set to have an appropriate input level and frequency band, before being input to quadrature detection circuit 602.

A/D conversion circuit 603 quantizes the I signal based on a sampling clock to obtain a digital I signal, and outputs a quantized digital I signal to received signal buffer 605. A/D conversion circuit 604 has the same configuration as A/D conversion circuit 603, quantizes the Q signal, and outputs a quantized digital Q signal to received signal buffer 605. This embodiment is not limited to any particular conversion method and bit resolution in each of A/D conversion circuits 103 and 104 as long as those are determined according to system specifications.

In addition it is assumed in this embodiment that the received signal is given the predetermined digital modulation and is a downlink signal with a burst configuration transmitted from a base station, and that a known symbol sequence that is the known signal is inserted into the burst. However known-symbol inserting position and number are not limited in particular in this embodiment. It may be possible to insert a sequence of a few tens of symbols into a center portion of the burst, or to insert at least one symbol at predetermined intervals in the burst. It is further assumed that the sampling rate is twice the symbol rate as an example.

The digital I and Q signals are stored for buffering in received signal buffer 605. Received signal buffer 605 is comprised of, for example, a memory enabling storage of quantized data corresponding to equal to or more than one burst length or FIFO (First In First Out) buffer.

Known vector table 606 has stored complex conjugate vector sequences of vector sequences to be obtained in the case where sampling is performed at an interval of a known symbol sequence inserted in the burst at ideal reception timings. For example, known vector table 606 is comprised of a memory such as a RAM and ROM. It is assumed in this embodiment that known vector table 606 has stored complex conjugate vector sequences corresponding to a case where sampling is performed at an interval of a known symbol sequence at a sampling rate twice the symbol rate, i.e., twice oversampling.

Vector operation circuit 607 performs vector operation using the digital I and Q signals stored in received signal buffer 605 and the known vector sequence stored in known vector table 606, and outputs the operation result to operation result buffer 608. For example vector operation circuit 607 is comprised of operation processing block configured by logic or DSP.

The operation result output from vector operation circuit 607 is stored as buffering in operation result buffer 608. For example operation result buffer 608 is comprised of a memory such as a RAM or FIFO buffer.

Timing estimating circuit 609 estimates reception timings with accuracy finer than oversampling intervals using the vector operation result of the sampled digital I and Q signal sequence and known vector sequence. In this embodiment timing estimating circuit 609 is comprised of low-accuracy timing estimating circuit 6091 and high-accuracy timing estimating circuit 6092.

Low-accuracy timing estimating circuit 6091 estimates reception timings with accuracy equal to the oversampling rate using vector operation result stored in operation result buffer 608. In other words low-accuracy timing estimating circuit 6091 performs first-stage timing estimation that is relatively rough. For example low-timing estimating circuit 6091 is comprised of a peak detecting circuit that detects a timing at which the operation result in vector operation circuit 607 is maximum.

High-accuracy timing estimating circuit 6092 estimates reception timings with accuracy higher than the oversampling rate using the vector operation result stored in operation result buffer 608 and estimated result in low-accuracy timing estimating circuit 6091. In other words high-accuracy timing estimating circuit 6092 performs second-stage timing estimation with high accuracy. For example high-accuracy timing estimating circuit 6092 is comprised of operation value ratio table 6093 and operation value ratio determining circuit 6094.

In operation value ratio table 6093, operation value ratios, described below, which are beforehand calculated for each unit time that is extremely short are stored as table values and read out when necessary.

The operation value ratio is herein explained. Values are beforehand calculated which are obtained in performing the same operation as in vector operation circuit 607 on a signal sequence which is obtained in sampling the received signal at timings shifted extremely short time with respect to ideal reception timings. The operation value ratio is a ratio of an operation value and another operation value obtained at the time one sample before the operation value in thus performed operation. The operation value ratios are obtained in advance for unit time that is finer than the sampling rate. In this embodiment, the operation value ratios are calculated for each timing shift $1/16$ times the symbol duration over a range of $\pm 1/4$ symbol from an ideal reception timing to be stored as table values.

Operation value ratio determining circuit 6094 performs the timing estimation with high accuracy using the low-accuracy timing estimated result, vector operation result stored in operation result buffer 608, and values of the operation value ratio table. The operation thereof is described later in detail. In addition it is assumed in this embodiment that a rough position of a burst is also unknown at the time reception timing estimation is initiated.

Digital demodulation circuit 610 performs demodulation using sample data of I and Q signals closest to a signal point among data of quantized I and Q signals based on the estimated timing information, and outputs a demodulated data sequence (received data).

The following explains about the reception operation in the communication terminal apparatus with the configuration as described. The digital-modulated Q and I signals are sampled at the oversampling rate twice the symbol rate, and a digital data sequence with a length corresponding to equal to or more than one burst is stored in received signal buffer 605.

Vector operation circuit 607 performs the vector operation shown in the equation (6) using $Rx(m)=\{I(m), Q(m)\}$ that is the I and Q signal vector sequence stored in received signal buffer 605 and $Ref^*(i)=\{Iref(i), Qref(i)\}$ that is a conjugate complex vector sequence of a known vector stored in known vector table 606 to obtain a value of C(m) at each sampling timing m, and stores the operation result in operation result buffer 608.

$$C(m) = \sum_{i=0}^{2N-1} |Rx(m+i) \times Ref*(i)|^2 \qquad \text{eq. (6)}$$

N is indicative of the number of symbols inserted into the burst.

It is known, as illustrated in FIG. 10A, that C(m) obtained by the equation (6) has a maximum value around a position at which the known symbol is inserted in the received burst. Accordingly by detecting a timing at which C(m) is maximum in low-accuracy timing estimating circuit 6091, it is possible to estimate the timing at which the known symbol is inserted with accuracy within $\pm 1/2$ symbol duration, and to estimate a timing of the burst based on the estimated timing.

FIG. 10A is a graph illustrating the operation result in the case where the vector operation of the equation (6) is obtained in advance for each unit time that is extremely short. FIG. 10B is a graph for plotting the operation value ratio $R(t)=C(t)/C(t-T/2)$ over successive samples, i.e., a period of a one-half symbol duration with respect to the operation result illustrated in FIG. 10A. Values of R(t) calculated in advance for each unit time $1/16$ times the symbol duration are stored in operation value ratio table 6093.

Operation value ratio determining circuit 6094 calculates C(m)/C(m−1) that is a ratio of the vector operation result C(m) at the timing estimated in low-accuracy timing estimating circuit 6091 and the vector operation result C(m−1) at a timing one-half symbol duration before the estimated timing, detects a position in the operation value ration table closest to the above calculated value, and thereby estimates the timing with high accuracy.

For example assuming a case that a timing of twice oversampling at the receiver is shifted $-2/16$ times the symbol duration with respect to an ideal reception timing, in other words, that the timing is illustrated with in FIG. 10A, the process of the timing estimation in this case is explained.

First low-accuracy timing estimating 6091 detects a peak of C(m), and thereby $t=-2/16 T$ is obtained as the timing estimated result with low accuracy. Next operation value ratio determining circuit 6094 calculates $R(t)=C(-2/16 T)/C(-2/16 T - 1/2 T) \approx 3.4$, and compares this value of R(t) with values of operation value ratio table 6093 as illustrated in FIG. 10B. In this case, this value of R(t) is closest to a table value at $t=-2/16 T$, whereby it can be estimated that the current timing of oversampling is shifted $-2/16$ times the symbol duration with respect to the ideal reception timing.

According to this embodiment of the present invention as described above, rough timing estimation is first performed at the sampling rate in reception, and then high-accuracy timing estimation is performed based on a ratio of correlation values with respect to the known signals, whereby it is possible to estimate a reception timing in demodulating a digital-modulated signal in the reception with accuracy higher than resolution of the oversampling in the reception. In particular by using a ratio of vector operation values in the timing estimation in the high-accuracy timing estimating circuit, it is only required to consider a relative ratio of successive received signal levels, not absolute values thereof, whereby it is possible to prevent adverse effects such as a control error of AGC in reception from being provided, enabling timing estimation with higher accuracy.

In addition this embodiment explains about the case that the oversampling rate of the I and Q signals is twice the symbol rate, and that the estimation accuracy of timing estimated in high-accuracy timing estimating circuit 6092 is 16 times the symbol rate, however is not limited to the above case. It is only required to set the time resolution of table values obtained in advance in high-accuracy timing estimating circuit 6092 to be accuracy higher than the oversampling rate.

Further this embodiment explains about the case that the equation (6) is used as the vector operation to obtain the correlation with the known vector sequence, however is not limited to the above case. It may be possible to use as the vector operation, for example, the absolute value of the sum of vector products as shown in the equation (7), or to use a value obtained without squaring the vector length to simplify the operation. Moreover it may be possible to use any operation capable of obtaining a result corresponding to the correlation.

$$C(m) = \left| \sum_{i=0}^{2N-1} \{Rx(m+i) \times Ref*(i)\} \right| \qquad \text{eq. (7)}$$

Furthermore this embodiment explains about the case of using, as a criterion for use in estimating a timing with high accuracy, the ratio R(t) of a vector operation result at a timing to that at another timing a one-sample duration before the timing, however is not limited to the above case. For example, it may be possible to use an operation result ratio R'(t)=C(t)/C(t+T/2) which is a ratio of a vector operation result at a timing to that another timing the one-sample duration after the timing, or to estimate a timing with the most likelihood using R(t) and R'(t). Moreover it may be possible to store operation values of successive several samples to estimate a timing that minimizes a squared error.

In addition it may be possible to use a real value or a logarithmic difference value as the operation value ratio used in high-accuracy timing estimating circuit 6092 in this embodiment.

Figure 11:
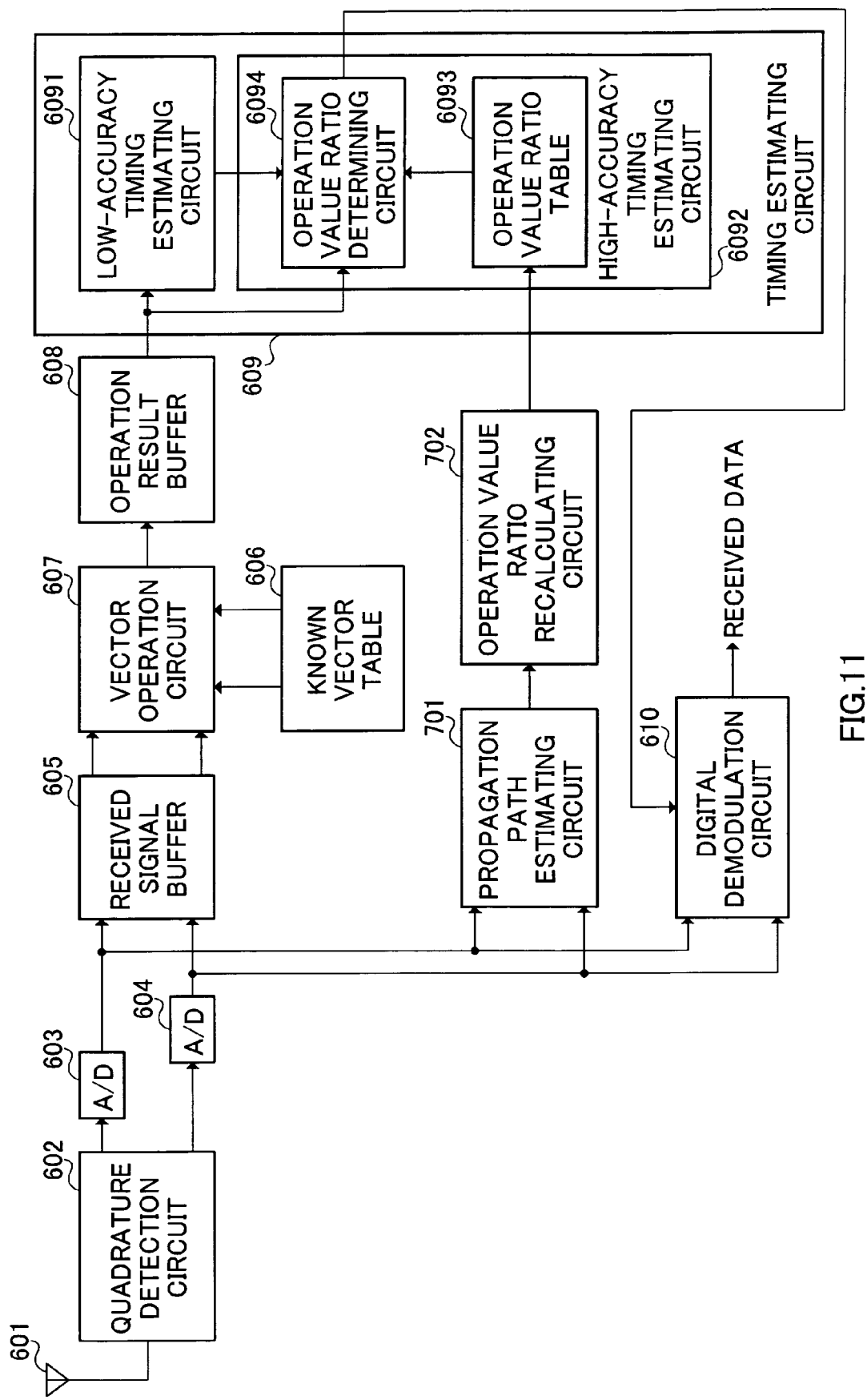
FIG. 11 is a block diagram illustrating another example of a configuration of a communication terminal apparatus provided with a reception apparatus according to the sixth embodiment of the present invention.

Further when there are known in advance frequency/phase characteristics of a filter in a transmitter and/or in a receiver, and/or those on a propagation path in communications, it may be possible to generate data of the known vector table including these characteristics to store. Moreover as illustrated in FIG. 11, it may be possible that propagation path estimating circuit 701 performs propagation path estimation from a received signal, and outputs the estimated result to operation value ratio recalculating circuit 702, and that the circuit 702 recalculates an operation value ratio, and outputs the recalculated operation value ratio to operation value ratio table 6093, thereby updating calculation value ratio table 6093. It is thereby possible to reflect the propagation environment in the operation value ratio, and therefore to perform high-accuracy timing estimation even when the propagation environment varies and provide excellent reception performance.

Furthermore this embodiment explains the case that a burst timing is unknown, however is not limited to the above case. For example, in the case where the burst reception timing is known in advance, for example, with accuracy of a few symbols, it may be possible to perform the vector operation over a limited range including a few symbols before and after the burst timing.

Moreover this embodiment explains only about the method of estimating reception timings with accuracy, however is not limited to the above case. For example it may be possible to use the estimated result to correct a timing of oversampling so as to obtain an ideal sampling timing in receiving a next burst, or to use the estimated result in demodulation and transmission.

Seventh Embodiment

This embodiment explains about a case of selecting a signal (filtering result) with the most reliability from among signals subjected to filtering with an ISI canceling filter comprised of various filter taps, and detecting a timing for the signal.

Figure 12:
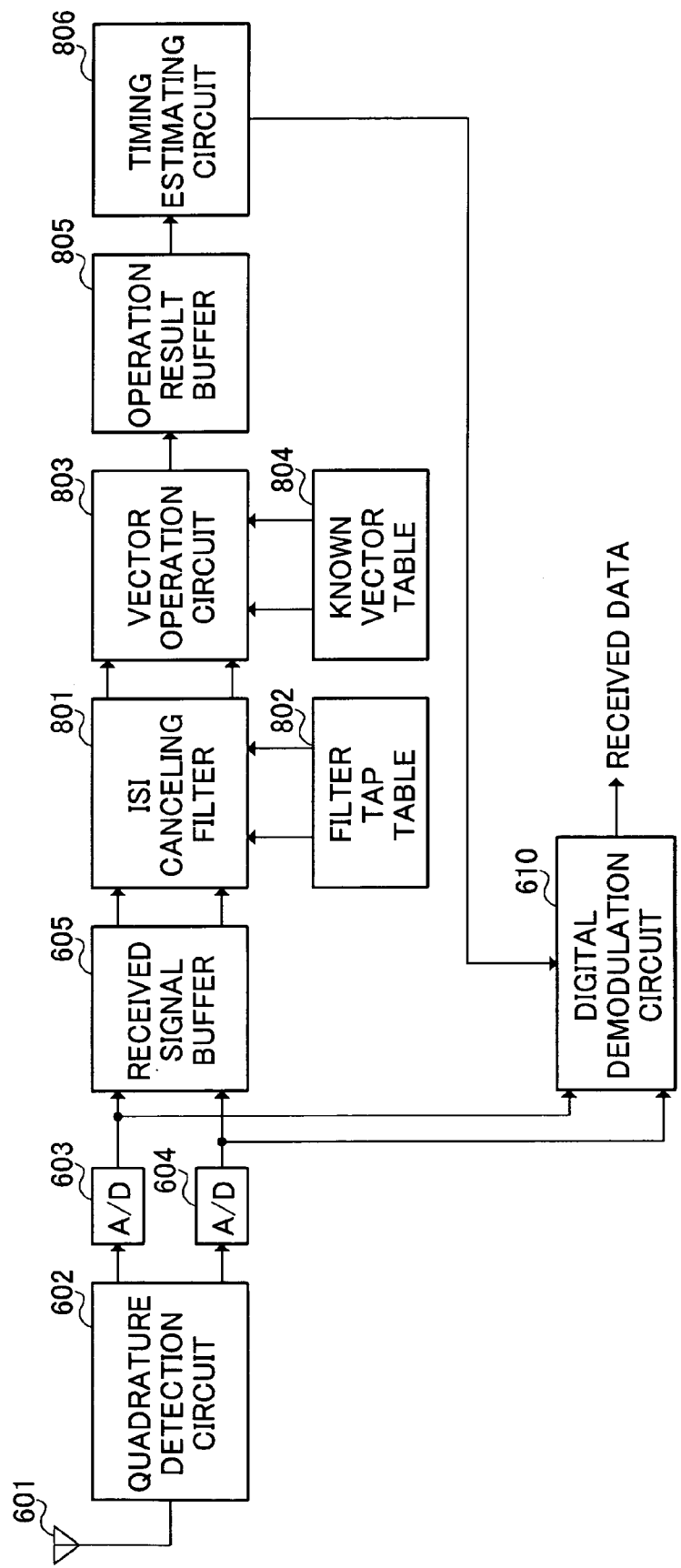
FIG. 12 is a block diagram illustrating a configuration of a communication terminal apparatus provided with a reception apparatus according to a seventh embodiment of the present invention.

FIG. 12 is a block diagram illustrating a configuration of a communication terminal apparatus provided with a reception apparatus according to the seventh embodiment. In addition in the configuration illustrated in FIG. 12, sections the same as those in FIG. 11 are given the same marks as in FIG. 11 to omit detailed explanation thereof.

It is assumed in this embodiment that a received signal is given predetermined digital modulation, and transmitted with a burst configuration, further this digital-modulated signal has intersymbol interference (hereinafter referred to as ISI) caused by band-pass filtering in transmitting the signal and effects from a propagation path, and that the interference characteristics are expected in advance at a reception side apparatus.

Further as well as the sixth embodiment, it is assumed that a known symbol sequence is inserted into the burst in the received signal, however known-symbol inserting position and number are not limited in particular in this embodiment, and that sampling rate is twice the symbol rate as an example.

Digital I and Q signals are stored for buffering in received signal buffer 605. For example received signal buffer 605 is comprised of a memory enabling storage of quantized data corresponding to equal to or more than one burst length or FIFO (First In First Out) buffer.

Filter tap table 802 is a table to be read in which filter tap coefficients are stored which are beforehand obtained inverse characteristics to the ISI to be provided on a digital-modulated signal to be received due to band-pass processing in transmitting the signal and effects from the propagation path.

Herein it is assumed that a plurality of kinds of the tap coefficients are prepared as follows. That is, there are prepared nine kinds of tap coefficients ($-4/16T$, $-3/16T$, $-2/16T$, $-1/16T$, $0$, $+1/16T$, $+2/16T$, $+3/16T$, $+4/16T$) which are the inverse characteristics with respect to the digital-modulated signal sampled at the twice-oversampling rate while shifting the timing at intervals of $1/16$ times the symbol duration with respect to an ideal reception timing.

In addition it is not necessary that the tap coefficients are complete inverse characteristics with respect to the ISI. For example it may be possible to use characteristics which enable the ISI to be canceled only at a sampling point closest to the ideal reception timing. FIG. 13B illustrates an example of nine kinds of tap coefficients stored in the filter tap table when a filter with a characteristic illustrated in FIG. 13A is used as a band-pass filter in transmission.

ISI canceling filter 801 performs filtering processing for ISI canceling on the digital I and Q signals to output to vector operation circuit 803. The plurality of tap coefficients are provided from filter tap table 802 to the filter 801, and a filtering processing result corresponding to each tap coefficient is output. Known vector table 804 has stored complex conjugate vectors over a known symbol sequence interval inserted into the burst. For example known vector table 804 is comprised of a memory such as a RAM and ROM. In this embodiment the complex conjugate vectors of vectors obtained by performing transmission filtering, propagation path characteristics, and ISI canceling filtering on a vector sequence of the known symbol sequence interval are stored at twice-oversampling intervals.

Vector operation circuit 803 performs vector operation using input digital I and Q signal data and the known vector sequence stored in known vector table 804. For example vector operation circuit 803 is comprised of an operation processing block configured by logic or DSP. The operation is performed using the equation (6) in the sixth embodiment.

Operation result buffer 805 stores the operation result obtained in vector operation circuit 803 for buffering. For example operation result buffer 805 is comprised of a memory such as a RAM or FIFO buffer.

Timing estimating circuit 806 estimates reception timings with resolution finer than oversampling intervals using the operation result of the received I and Q signals and known vector sequence, and outputs the estimated result. The detailed operation is described later.

The following explains in detail about the operation of the communication terminal apparatus with the configuration as described above.

I and Q signals are sampled at the oversampling rate twice the symbol rate, and a digital data sequence with a length corresponding to equal to or more than one burst is stored in received signal buffer 605. It is assumed herein as an example that a sampling timing is shifted $-\frac{2}{16}T$ with respect to an ideal reception timing.

ISI canceling filter 801 performs filtering processing on digital I and Q signal data sequences stored in received signal buffer 605 using each of the nine kinds of filter taps provided from filter tap table 802. This processing result is output to vector operation circuit 803. A signal is output from which the ISI is ideally canceled only as a result of a case of using a tap coefficient calculated based on a timing of $-\frac{2}{16}T$ among the nine kinds of filter tap coefficients used at this point. In the cases where the other tap coefficients are used, the ISI is not canceled completely, and a distortion component due to the ISI is further multiplexed on a resultant signal by the filtering processing depending on the cases.

Vector operation circuit 803 performs the vector operation processing in the same way as the equation (6) in the sixth embodiment on each of the nine kinds of filtering processing results output from ISI canceling filter 801. The operation result is output to operation result buffer 805.

As the operation results to be output to operation result buffer 805, nine kinds thereof are obtained for each sampling timing. Timing estimating circuit 806 detects an operation result with a maximum value among the operation results stored in operation result buffer 805. In unit twice-oversampling interval, the maximum value is obtained when data is used which is present closest to a position at which the known vector sequence is inserted in the burst. Further among the operation results with eight kinds of filter tap coefficients calculated at the timing of the data, the operation result has the maximum value when the filter tap coefficient based on the timing of $-\frac{2}{16}T$ is used. Accordingly it can be estimated that the sampling timing with the maximum value is shifted $-\frac{2}{16}T$ with respect to the ideal sampling timing.

According to this embodiment of the present invention as described above, an operation result with the most likelihood is selected from various operation results of the filtering obtained by changing the filtering tap coefficients corresponding to shifts from the ideal timing, and a shift corresponding to the operation result is obtained as the shift from the ideal sampling timing. It is thereby possible to estimate a reception timing in demodulating a received digital-modulated signal with accuracy higher than resolution of the oversampling in receiving the signal.

In addition this embodiment explains about the case that the equation (6) is used for the vector operation to obtain the correlation degree with the known vector sequence, however is not limited to the above case as well as the sixth embodiment.

Further the nine kinds of tap coefficients with the resolution $\frac{1}{16}$ times the symbol duration in the filter tap coefficient table, assumed in this embodiment, are one of examples. It may be possible that symbol resolution is made fine corresponding to the required accuracy, and according to the fine resolution the number of tables to be prepared is increased, or that the symbol resolution is made rough, or the number of tables to be prepared is decreased according to the rough resolution.

Furthermore a reception band-pass filter is not specified in this embodiment in particular. That is, it may be possible to perform filtering processing on a received signal at a stage before an IF section, or sampling in the reception apparatus, to store the received signal in the reception buffer to perform filtering processing thereon at a stage before the ISI filtering, or to include the band-pass characteristics into the characteristics of the ISI canceling filter.

Eighth Embodiment

This embodiment explains about a case of demodulating a data portion of a received signal at a timing obtained with the method of the seventh embodiment.

Figure 14:
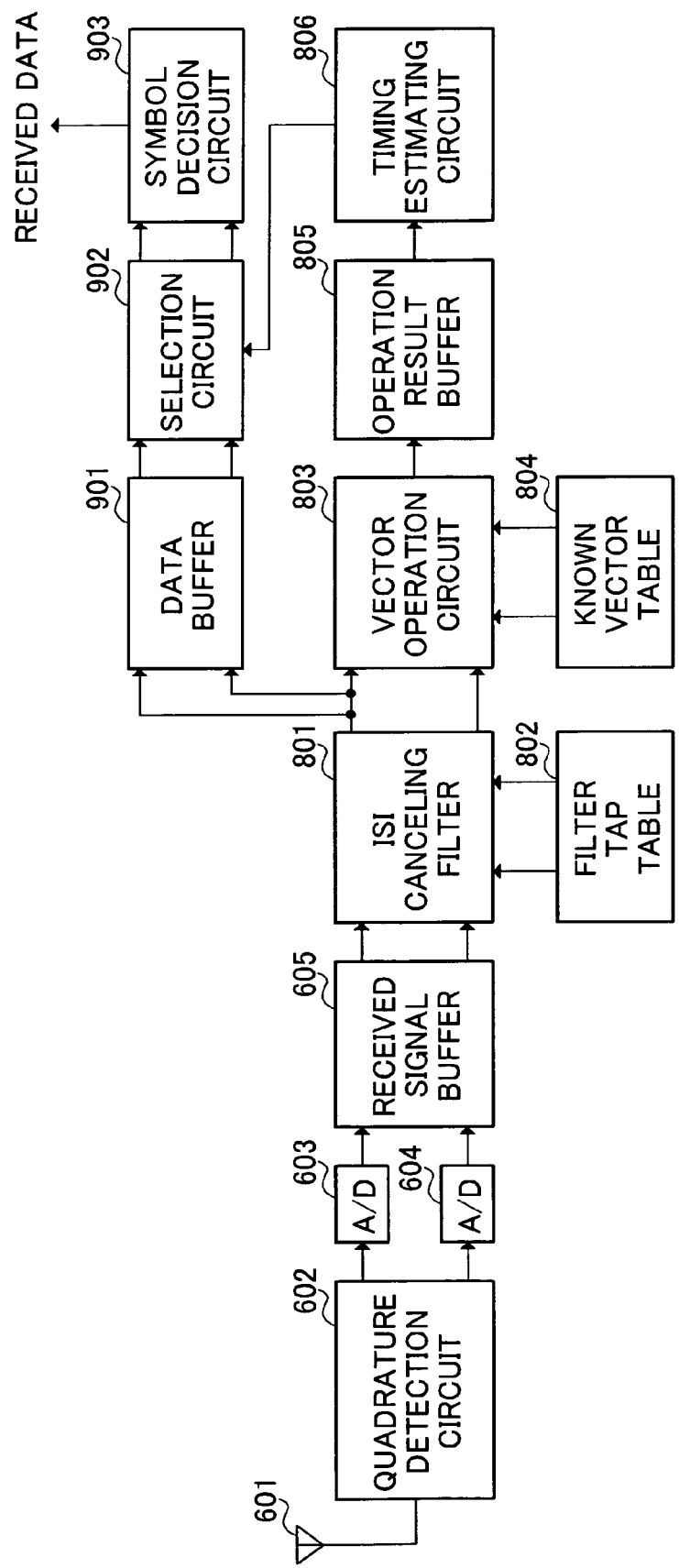
FIG. 14 is a block diagram illustrating a configuration of a communication terminal apparatus provided with a reception apparatus according to an eighth embodiment of the present invention.

FIG. 14 is a block diagram illustrating a configuration of a communication terminal apparatus provided with a reception apparatus according to the eighth embodiment of the present invention. The configuration illustrated in FIG. 14 has the same configuration illustrated in FIG. 12 except data buffer 901, selection circuit 902 and symbol decision circuit 903, which are further provided. Accordingly in FIG. 14, sections the same as those in FIG. 12 are given the same marks as those in FIG. 12 to omit detailed explanations thereof.

Data buffer 901 stores a plurality of kinds of filtering processing results output from ISI canceling filter 801 for buffering. For example data buffer 901 is comprised of a memory enabling storage of quantized data corresponding to equal to or more than one burst length or FIFO buffer.

Based on the timing estimated result, selection circuit 902 selects one kind from the plurality of kinds of ISI canceling filter output results. Symbol decision circuit 903 performs symbol decision on a digital-modulated signal using I and Q signal data. There is assumed in this embodiment a case of performing quasi-coherent detection on a QPSK modulated signal, in which phase correction is performed using vector data of an interval at which a known symbol is inserted in a received burst, and then an I-Q plane is divided into four regions to perform the symbol decision.

The following explains about the operation of the communication terminal apparatus with the configuration as described above. The operation of estimating a reception timing with high accuracy is the same as that in the seventh embodiment, and herein explained is the operation in the case where demodulation is performed using the timing estimated result in the reception apparatus.

Based on the timing estimated result output from timing estimating circuit 806, selection circuit 902 selects a filter output signal at a timing matching with the estimated timing from among nine kinds of filter outputs stored in data buffer 901 to output to symbol decision circuit 903. This filter output signal is in a condition that an ISI component is canceled therefrom using an ideal tap coefficient. Therefore performing the symbol decision on this signal in symbol decision circuit 903 obtains a normal symbol decision result.

According to this embodiment of the present invention as described above, a timing is estimated with accuracy higher than the resolution of the oversampling in reception, and a signal is selected which is subjected to ISI canceling filtering with a filter tap coefficient in consideration of a shift of a timing expected from the obtained timing estimated result to perform the symbol decision. It is thereby possible to perform more correct symbol decision even when the oversampling timing in the reception is shifted with respect to an ideal reception timing.

In addition this embodiment has a configuration in which data buffer 901 for storing ISI canceling filter outputs is provided at a position illustrated in FIG. 14. However this embodiment is not limited to the above configuration, and may adopt a configuration, for example, in which data buffer 901 is provided between ISI canceling filter 801 and vector operation circuit 803. Further this embodiment uses the QPSK as an example of modulation methods, however is not limited to the above case, and various modulation methods are applicable.

Ninth Embodiment

This embodiment explains about a case of performing high-accuracy timing estimation using the ISI canceling filter in the reception operation as explained in the sixth embodiment.

Figure 15:
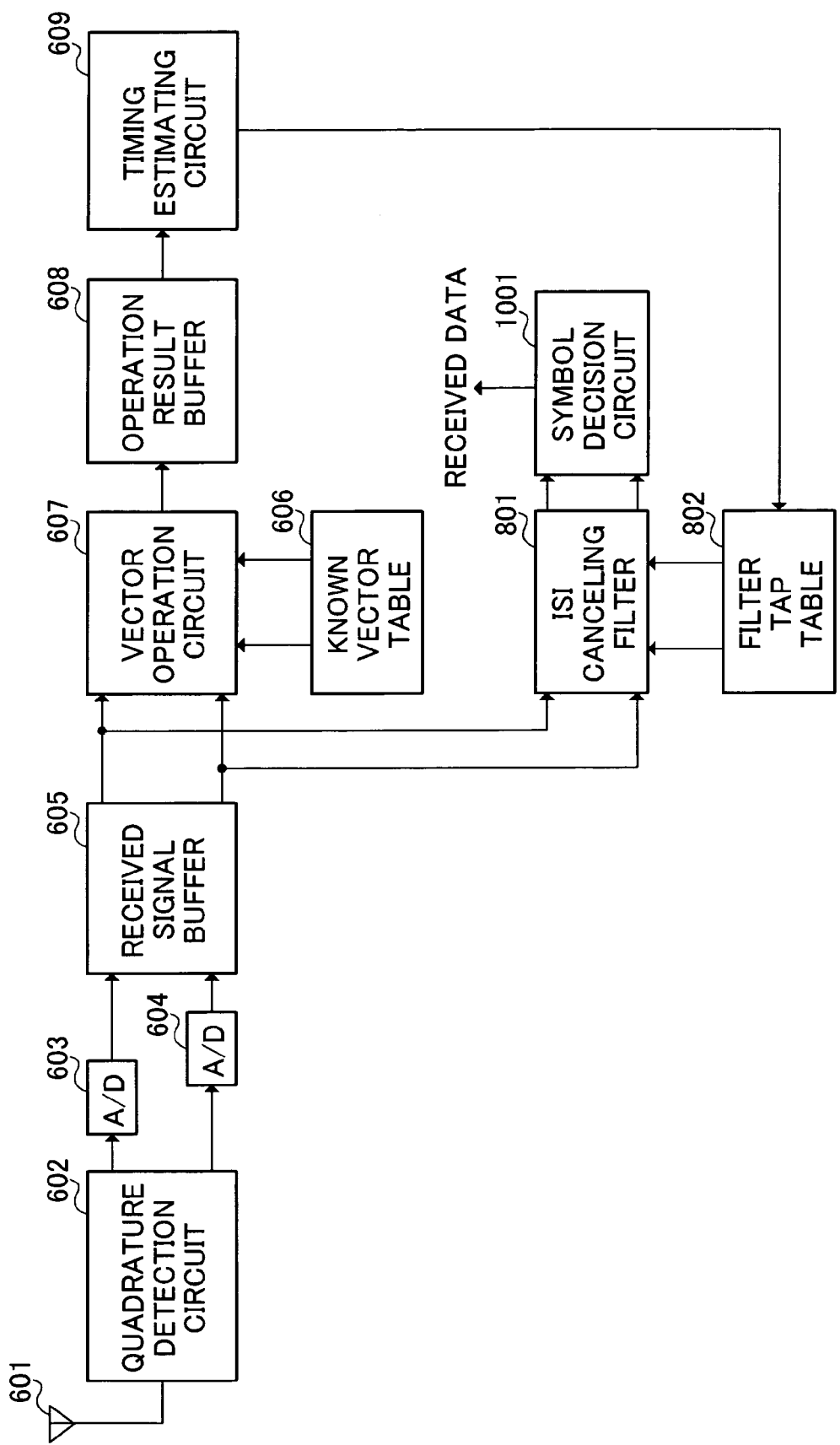
FIG. 15 is a block diagram illustrating a configuration of a communication terminal apparatus provided with a reception apparatus according to a ninth embodiment of the present invention.

FIG. 15 is a block diagram illustrating a configuration of a communication terminal apparatus provided with a reception apparatus according to the ninth embodiment of the present invention. The configuration in FIG. 15 is the same as that illustrated in FIG. 9 except further provided filter tap table 802, ISI canceling filter 801 and symbol decision circuit 1001. Accordingly in the configuration illustrated in FIG. 15, sections the same as those in FIG. 9 are given the same marks in FIG. 9 to omit detailed explanation thereof. Timing estimating circuit 609 has the same configuration and operation as the timing estimating circuit explained in FIG. 9 in the sixth embodiment. Also in this embodiment, timing estimating circuit 609 obtains reception timings per $1/16$ times the symbol duration basis using digital I and Q signals obtained by quadrature demodulation and twice-oversampling.

Filter tap table 802 is the same as the filter tap table explained in the seventh embodiment, and a table to be read in which filter tap coefficients are stored which are beforehand obtained inverse characteristics to the ISI to be provided on a digital-modulated signal to be received due to band-pass processing in transmitting the signal and effects from the propagation path. Herein as the tap coefficients, as well as the filter tap table 802, there are prepared nine kinds of tap coefficients ($-4/16T$, $-3/16T$, $-2/16T$, $-1/16T$, 0, $+1/16T$, $+2/16T$, $+3/16T$, $+4/16T$) which are the inverse characteristics with respect to the digital-modulated signal sampled at the twice-oversampling rate while shifting the timing at intervals $1/16$ times the symbol duration with respect to an ideal reception timing, and among those one kind of the tap coefficient is selected and output when necessary.

ISI canceling filter 801 performs filtering processing for ISI canceling on digital I and Q signals to output to symbol decision circuit 1001. In other words, the digital I and Q signals are subjected to the filtering processing with ISI canceling filter 801 using the filter tap coefficient from filter tap table 802, and the processing result is output to symbol decision circuit 1001.

Symbol decision circuit 1001 performs symbol decision on a digital-modulated signal using I and Q signal data. There is assumed in this embodiment a case of performing quasi-coherent detection on a QPSK modulated signal, in which phase correction is performed using vector data of an interval at which a known symbol is inserted in a received burst, and then an I-Q plane is divided into four regions to perform the symbol decision.

The operation of estimating a reception timing with high accuracy in the communication terminal apparatus with the above configuration is the same as that in the sixth embodiment, and herein explained is the operation in the case where demodulation is performed using the timing estimated result in the reception apparatus.

In filter tap table 802, based on the timing estimated result output from timing estimating circuit 609, an appropriate filter tap coefficient is selected from among stored nine kinds of filter tap coefficients, and is output to ISI canceling filter 801. For example, in the case where the timing estimated result is indicative of that the estimated timing is shifted $-2/16T$ with respect to an ideal reception timing, a filter tap coefficient based on $-2/16T$ is selected, and the filter tap coefficient is output to ISI canceling filter 801.

Since the result obtained by processing the filtering using this filter tap coefficient provides a signal from which the ISI component is canceled, performing symbol decision on this signal in symbol decision circuit 1003 obtains a normal symbol decision result.

According to this embodiment of the present invention as described above, a timing is estimated with accuracy higher than the resolution of the oversampling in reception, and a signal is selected which is subjected to ISI canceling filtering with a filter tap coefficient in consideration of a shift of a timing expected from the obtained timing estimated result. It is thereby possible to perform more correct symbol decision even when the oversampling timing in reception is shifted with respect to an ideal reception timing.

It may be possible to compose a partial or entire configuration of the reception apparatus according to any of the above first to ninth embodiments as software using a DSP or CPU. For example it may be possible to store a program for the reception timing estimation as described above in a ROM, and achieve the operation by instructions of the CPU according to the program. Further it may be possible to store the program for the reception timing estimation in a storage medium readable with a computer, store the program of the storage medium in a RAM of the computer, and achieve the operation according to the program. The same functions and effects as in the above first to ninth embodiments are obtained in these cases.

For example in a device having a memory storing a reception timing estimating program, the reception timing estimating program may be composed to include the procedures of performing first timing estimation of a received signal at a first sampling timing to output a first timing estimated result, while performing second timing estimation of the received signal at a second sampling timing with a predetermined phase difference with respect to the first sampling timing to output a second timing estimated result, of switching the first sampling timing and the second sampling timing, and of performing timing estimation with time resolution twice that in performing the first timing estimation and second timing estimation using the first timing estimated result and the second timing estimated result.

Further in a device having a memory storing a reception timing estimating program, the reception timing estimating program may be composed to include the procedures of performing timing estimation of a received signal at a predetermined sampling timing to output a third timing estimated result, and of performing timing estimation based on a correlation value ratio of known signals between samples sampled at the sampling rate and the third timing estimated result to output a fourth timing estimated result.

Furthermore in a device having a memory storing a reception timing estimating program and filter tap coefficients each with a characteristic for canceling intersymbol interference with a known signal in a received signal sampled at a sampling timing shifted a unit time shorter than a sampling duration of a predetermined sampling rate, the reception timing estimating program may be composed to include the procedures of performing filtering on the received signal with the filter tap coefficients to output a plurality of filtering results, and of performing fifth timing estimation based on the plurality of filtering results.

As explained above, according to the present invention, it is possible to decrease a sampling period in an A/D conversion circuit or D/A conversion circuit to be lower than a level required for accuracy specification in a system, and to decrease current consumption and cost in a terminal.

Further according to the present invention, it is possible to estimate a reception timing in demodulating a digital-modulated signal in reception with accuracy higher than resolution of oversampling in the reception.

While the above first to ninth embodiments each explains about a communication terminal apparatus provided with a reception apparatus or transmission/reception apparatus according to the present invention, the reception apparatus or transmission/reception apparatus according to the present invention may be mounted on a base station apparatus in a digital radio communication system.

The present invention is not limited to the above described embodiments, and various variations and modifications may be possible without departing from the scope of the present invention.

This application is based on the Japanese Patent Application No. HEI11-262967 filed on Sep. 17, 1999, entire content of which is expressly incorporated by reference herein.

What is claimed is:

1. A reception apparatus comprising:
 a generator that generates a sampling timing at a predetermined sampling rate;
 a first estimator that estimates a first synchronization timing of a received signal at the sampling timing;
 a switch that shifts a phase of the sampling timing by 180°;
 a second estimator that estimates a second synchronization timing of the received signal at a sampling timing phase shifted from the sampling timing of the first synchronization timing by 180°; and
 a third estimator that estimates a third synchronization timing, which is a definitive synchronization timing of the received signal, from the first synchronization timing and the second synchronization timing,
 wherein the switch shifts the phase of the sampling timing at a time interval longer than a symbol duration.

2. The reception apparatus according to claim 1, wherein the third estimator further estimates the third synchronization timing at a time resolution twice the time resolution of said predetermined sampling rate, based on reliability information indicating a likelihood of the first synchronization timing and the second synchronization timing.

3. The reception apparatus according to claim 1, wherein the third estimator further chooses the synchronization timing of higher reliability as the third synchronization timing, based on reliability information indicating a likelihood of the first synchronization timing and the second synchronization timing.

4. The reception apparatus according to claim 1, wherein the third estimator further estimates the third synchronization timing through interpolation of the first synchronization timing and the second synchronization timing, based on reliability information indicating a likelihood of the first synchronization timing and the second synchronization timing.

5. The reception apparatus according to claim 1, further comprising a controller that controls a period of an operation mode in which the switch shifts the phase of the sampling timing.

6. The reception apparatus according to claim 5, wherein the switch further fixes the phase of the sampling timing at a phase corresponding, during a mode other than the operation mode, to the third synchronization timing estimated during an earlier operation mode.

7. The reception apparatus according to claim 1, further comprising a transmitter that transmits transmission data using a sampling timing corresponding to the third synchronization timing.

8. A reception apparatus comprising:
 a generator that generates a sampling timing at a sampling rate corresponding to a reference clock signal;
 a first estimator that estimates a first synchronization timing of a received signal at the sampling timing;
 a switch that shifts a phase of the sampling timing by inverting a polarity of the reference clock signal;
 a second estimator that estimates a second synchronization timing of the received signal at the sampling timing phase-shifted from the sampling timing of the first synchronization timing; and
 a third estimator that estimates a third synchronization timing, which is a definitive synchronization timing of the received signal, based upon the first synchronization timing and the second synchronization timing,
 wherein the switch inverts the polarity of the reference clock signal at a time interval longer than a symbol duration.

9. A reception apparatus comprising:
 a receiver that samples a received signal at a predetermined sampling timing;
 an operator that determines a correlation between the received signal and a known signal sequence through a vector operation;
 a first estimator that estimates a first synchronization timing of the received signal based on an operation result of said operator;
 an operation value ratio table that stores operation value ratios and a plurality of associated short times, said operation value ratios indicating ratios between a plurality of correlations determined at sampling timings shifted from ideal sampling timings by the short times; and
 a second estimator that reads said operation value ratio table and detects an operation value ratio closest to a ratio between the correlations corresponding to the first synchronization timing, and estimates a timing shifted from the first synchronization timing by a short time corresponding to the detected operation value ratio as the second synchronization timing.

10. The reception apparatus according to claim 9, further comprising:
 a propagation path estimator that estimates a propagation path condition; and
 an updater that updates the operation value ratio table based on the propagation path condition.

11. The reception apparatus according to claim 9, further comprising:
 a tap coefficient table that stores tap coefficients and a plurality of associated short times, the tap coefficients corresponding to sampling timings shifted from ideal sampling timings by the short times; and
 a canceler that cancels inter symbol interference from the received signal using tap coefficient corresponding to a short time indicating a shift between the first synchronization timing and the second synchronization timing among the tap coefficients in said tap coefficient table.

12. A reception apparatus comprising:
a receiver that samples a received signal at a predetermined sampling timing;
a tap coefficient table that stores tap coefficients and a plurality of associated short times, the tap coefficients corresponding to sampling timings shifted from ideal sampling timings by the short times;
a canceler that cancels inter symbol interference from the received signal using the tap coefficients in said tap coefficient table;
an operator that determines correlation between signals having inter symbol interference removed and corresponding to the tap coefficients respectively, and a known signal sequence; and
an estimator that detects a tap coefficient that yields a maximum operation result in said operator and estimates a timing shifted from the predetermined sampling timing by a short time corresponding to the detected tap coefficient as a synchronization timing of the received signal.

13. The reception apparatus according to claim 12, further comprising a demodulator that demodulates a signal having inter symbol interference removed and corresponding to the tap coefficient detected by the estimator.

14. A reception method comprising:
generating a sampling timing at a predetermined sampling rate;
estimating a first synchronization timing of a received signal at the sampling timing;
shifting a phase of the sampling timing by 180° at a time interval longer than a symbol duration;
estimating a second synchronization timing of the received signal at a sampling timing phase shifted from the sampling timing of the first synchronization timing by 180°; and
estimating a third synchronization timing, which is a definitive synchronization timing of the receiving signal, from the first synchronization timing and the second synchronization timing.

15. A reception method comprising:
sampling a received signal at a predetermined sampling timing;
determining a correlation between the received signal and a known signal sequence through vector operation;
estimating a first synchronization timing of the received signal based on a vector operation result;
obtaining, from an operation value ratio table that stores operation value ratios and a plurality of associated short times, the operation value ratios indicating ratios between a plurality of correlations determined at sampling timings shifted from ideal sampling timings by the short times, and detecting an operation value ratio closest to a ratio between the correlations corresponding to the first synchronization timing; and
detecting a timing shifted from the first synchronization timing by a short time corresponding to the detected operation value ratio as a second synchronization timing.

16. A reception method comprising:
sampling a received signal at a predetermined sampling timing;
canceling inter symbol interference from the received signal using tap coefficients in a tap coefficient table which stores tap coefficients and a plurality of associated short times, the tap coefficients corresponding to sampling timings shifted from ideal sampling timings by the short times;
determining a correlation, through vector operation, between signals having inter symbol interference removed and corresponding to the tap coefficients respectively, and the known signal sequence;
detecting a tap coefficient that gives a maximum vector operation result; and
estimating a timing shifted from the predetermined sampling timing by a short time corresponding to the detected tap coefficient as a synchronization timing of the received signal.

17. A reception apparatus comprising:
a receiver that samples a received signal at predetermined sampling intervals to obtain sample timings;
an operator that determines a correlation at each sample timing through a vector operation using a sampling result of said receiver and a known signal sequence;
a first estimator that estimates a sample timing corresponding to a largest correlation of the determined correlations as a low-accuracy synchronization timing of the received signal;
an operation value ratio table that associates an operation value ratio with a short time, said operation value ratio indicating a ratio between two correlations corresponding to a pair of neighboring sample timings including a sample timing shifted from an ideal synchronization timing by the short time, said short time being shorter than a sample interval of the predetermined sampling intervals; and
a second estimator that reads said operation value ratio table and detects an operation value ratio closest to a ratio between correlations corresponding to the low-accuracy synchronization timing and a sample timing next to the low-accuracy synchronization timing, and estimates a timing shifted from the low-accuracy synchronization timing by a short time corresponding to the detected operation value ratio as a high-accuracy synchronization timing.

18. A reception method comprising:
sampling a signal including a known signal sequence at predetermined sampling intervals to obtain sample timings;
determining a correlation at each sample timing through a vector operation using a sampling result and a known signal sequence.
estimating a sample timing corresponding to a largest correlation of the determined correlations as a low-accuracy synchronization timing of a received signal;
reading an operation value ratio table that associates an operation value ratio with a short time, said operation value ratio indicating a ratio between two correlations corresponding to a pair of neighboring sample timings including a sample timing shifted from an ideal synchronization timing by the short time, said short time being shorter than a sample interval of the predetermined sampling intervals;
detecting an operation value ratio closest to a ratio between correlations corresponding to the low-accuracy synchronization timing and a sample timing next to the low-accuracy synchronization timing; and
estimating a timing shifted from the low-accuracy synchronization timing by a short time corresponding to the detected operation value ratio as a high-accuracy synchronization timing.

* * * * *